US012222526B2

(12) United States Patent
Borisov et al.

(10) Patent No.: US 12,222,526 B2
(45) Date of Patent: Feb. 11, 2025

(54) MID-AIR IMAGE DISPLAY DEVICE AND METHOD OF OPERATING THE SAME

(71) Applicant: SAMSUNG ELECTRONICS CO., LTD., Suwon-si (KR)

(72) Inventors: Vladimir Nikolayevich Borisov, Saint Petersburg (RU); Svetlana Vladimirovna Danilova, Sergiev Posad (RU); Ilia Valer'evich Malyshev, Vsevolzhskiy District (RU); Nikolay Victorovich Muravev, Podolsk (RU); Mikhail Vyacheslavovich Popov, Krasnogorsk (RU); Stanislav Aleksandrovich Shtykov, Moscow (RU); Alexander Alekseyevich Aspidov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 679 days.

(21) Appl. No.: 17/543,356

(22) Filed: Dec. 6, 2021

(65) Prior Publication Data

US 2022/0179233 A1 Jun. 9, 2022

(30) Foreign Application Priority Data

Dec. 4, 2020 (RU) ............................... 2020139967
Nov. 12, 2021 (KR) ....................... 10-2021-0156052

(51) Int. Cl.
*G02B 30/56* (2020.01)
*G02B 27/10* (2006.01)

(52) U.S. Cl.
CPC ........... *G02B 30/56* (2020.01); *G02B 27/106* (2013.01)

(58) Field of Classification Search
None
See application file for complete search history.

(56) References Cited

U.S. PATENT DOCUMENTS

| 5,835,166 A | 11/1998 | Hall et al. |
| 6,294,775 B1 | 9/2001 | Seibel et al. |
| (Continued) | | |

FOREIGN PATENT DOCUMENTS

| CN | 101473439 A | 7/2009 |
| CN | 105259664 A | 1/2016 |
| (Continued) | | |

OTHER PUBLICATIONS

International Search Report and Written Opinion (PCT/ISA/220, PCT/ISA/210, and PCT/ISA/237) dated Mar. 10, 2022 issued by the International searching Authority in International Application No. PCT/KR2021/018265.

(Continued)

*Primary Examiner* — Robert E. Tallman
(74) *Attorney, Agent, or Firm* — Sughrue Mion, PLLC

(57) ABSTRACT

A mid-air image display device and an operation method thereof are provided. The mid-air image display device includes: a projection system configured to generate a light beam for an image; at least one positive lens; and a light multiplication module comprising a first transmission grating, a second transmission grating, a waveguide and a reflection grating, and configured to receive the light beam from the projection system and transmit the received light beam through the first transmission grating, the second transmission grating, the waveguide and the reflection grating, wherein the at least one positive lens is disposed on the light multiplication module, and configured to receive the light beam transmitted through the light multiplication module to form a mid-air image.

20 Claims, 32 Drawing Sheets

(56) References Cited

U.S. PATENT DOCUMENTS

| | | | |
|---|---|---|---|
| 7,830,368 | B2 | 11/2010 | Marttila et al. |
| 8,320,045 | B2 | 11/2012 | Martinez Anton et al. |
| 8,321,009 | B2 | 11/2012 | Rosemberg |
| 8,416,479 | B2 | 4/2013 | Kroll et al. |
| 8,586,285 | B2 | 11/2013 | Gates et al. |
| 8,928,988 | B1 | 1/2015 | Ford et al. |
| 9,134,699 | B2 | 9/2015 | Sung et al. |
| 9,829,612 | B1 | 11/2017 | Koudsi et al. |
| 9,860,443 | B2 | 1/2018 | Ford et al. |
| 10,002,215 | B2 | 6/2018 | Dowski et al. |
| 10,198,972 | B2 | 2/2019 | Basset et al. |
| 10,747,176 | B2 | 8/2020 | Kim |
| 10,809,664 | B2 | 10/2020 | Seo et al. |
| 10,942,490 | B2 | 3/2021 | Shestak et al. |
| 11,119,318 | B2 | 9/2021 | Yuan et al. |
| 11,169,485 | B2 | 11/2021 | Kim |
| 11,269,144 | B2 | 3/2022 | Oh et al. |
| 2015/0220058 | A1 | 8/2015 | Mukhtarov et al. |
| 2017/0199496 | A1 | 7/2017 | Grata et al. |
| 2018/0129166 | A1* | 5/2018 | Seo .................. G03H 1/268 |
| 2018/0341223 | A1* | 11/2018 | Shestak ............ G02B 6/0033 |
| 2019/0222828 | A1 | 7/2019 | Salvador et al. |
| 2019/0268588 | A1 | 8/2019 | Frayne et al. |
| 2019/0285904 | A1 | 9/2019 | Kim et al. |
| 2020/0041712 | A1 | 2/2020 | Peroz et al. |
| 2020/0292745 | A1* | 9/2020 | Waldern ............ G02B 6/0068 |

FOREIGN PATENT DOCUMENTS

| | | |
|---|---|---|
| CN | 105934902 A | 9/2016 |
| CN | 205919380 U | 2/2017 |
| CN | 102756805 B | 2/2018 |
| CN | 105593920 B | 6/2019 |
| GB | 810975 A | 3/1959 |
| JP | 2009-540440 A | 11/2009 |
| KR | 10-2008-0005968 A | 1/2008 |
| KR | 10-2018-0052357 A | 5/2018 |
| KR | 10-2018-0128247 A | 12/2018 |
| KR | 10-2019-0026610 A | 3/2019 |
| KR | 10-2019-0126408 A | 11/2019 |
| RU | 2751405 C1 | 7/2021 |
| WO | 2008020899 A2 | 2/2008 |
| WO | 2015081313 A2 | 6/2015 |
| WO | 2015081313 A9 | 6/2015 |
| WO | 2015184413 A1 | 12/2015 |
| WO | 2019/039600 A1 | 2/2019 |

OTHER PUBLICATIONS

Communication dated Jul. 14, 2023 issued by Korean Intellectual Property Office in counterpart Application No. 10-2021-0156052.

Communication dated Apr. 28, 2021 issued by the Federal Service for Intellectual Property in Russian application No. 2020139967.

Decision to Grant dated Jun. 10, 2021 issued by the Federal Service for Intellectual Property in Russian application No. 2020139967.

Yoshida, S., "fVisiOn: 360-degree viewable glasses-free tabletop 3D display composed of conical screen and modular projector arrays", Opt Express, Jun. 2016, 10 pages.

Okumura, M., et al., "Table-top Display System Which Enables to View from Four Directions for Group Work on Round Table", Proceedings of the International MultiConference of Engineers and Computer Scientists, 2009, vol. I, Mar. 2009, 6 pages.

Ni, L., et al., "360-degree large-scale multiprojection light-field 3D display system", Applied Optics, vol. 57, No. 8, Mar. 10, 2018, pp. 1817-1823.

Inoue, T., et al., "Table screen 360-degree holographic display using circular viewing-zone scanning", Opt Express, Mar. 2015, 10 pages.

* cited by examiner

MID-AIR IMAGE DISPLAY DEVICE AND METHOD OF OPERATING THE SAME

CROSS-REFERENCE TO RELATED APPLICATIONS

This application claims priority from Russian Patent Application No. 2020139967, filed on Dec. 4, 2020, in the Russian Patent Office and Korean Patent Application No. 10-2021-0156052, filed on Nov. 12, 2021, in the Korean Intellectual Property Office, the disclosures of which are incorporated herein in their entireties by reference.

BACKGROUND

1. Field

The disclosure relates to an integrated optical device, and more particularly, to a mid-air image display device for displaying a mid-air image in a free space, and a method of operating the same.

2. Description of the Related Art

In the field of mobile technology, there is an increasing demand for creative solutions with high information content and convenience. One of the things that requires technical implementation is a compact mid-air image display. A compact mid-air image display needs to be able to display images without additional scattering media. These displays require user a secure and contactless interface capable of displaying high-quality magnified images.

In addition, a mid-air image display device with a compact size, a wide field of view, and a high-definition image, which can be placed on a mobile device, is required, and the mid-air image display device requires no diffuser screen and no moving parts.

SUMMARY

The disclosure provides a compact mid-air image display device for displaying a high-quality magnified image.

The disclosure also provide a method for operating a mid-air image display device capable of displaying a high-quality magnified image.

Various embodiments will be set forth in part in the description which follows and, in part, will be apparent from the description, or may be learned by practice of the presented embodiments.

According to an embodiment, a mid-air image display device may include: a projection system configured to generate a light beam for an image; at least one positive lens; and a light multiplication module comprising a first transmission grating, a second transmission grating, a waveguide and a reflection grating, and configured to receive the light beam from the projection system and transmit the received light beam through the first transmission grating, the second transmission grating, the waveguide and the reflection grating, wherein the at least one positive lens is disposed on the light multiplication module, and configured to receive the light beam transmitted through the light multiplication module to form a mid-air image.

The projection system may be disposed above the at least one positive lens, the positive lens may be disposed above the waveguide of the light multiplication module, and the first transmission grating, the reflection grating, and the second transmission grating may be sequentially arranged below the waveguide.

The projection system may be disposed below the at least one positive lens, the at least one positive lens may be disposed below the waveguide, and the first transmission grating, the second transmission grating, and the reflection grating may be sequentially arranged above the waveguide.

The projection system may be disposed above at least one positive lens that may be disposed above the light multiplication module, a waveguide may be disposed below the first transmission grating, and the second transmission grating and the reflection grating may be arranged below the waveguide.

The at least one positive lens may be disposed below the reflection grating of the light multiplication module, the first transmission grating, the second transmission grating, and the waveguide may be disposed above the reflection grating, and the at least one light multiplication module may be disposed below the projection system.

The at least one positive lens may be disposed above the reflection grating of the light multiplication module, the second transmission grating, the first transmission grating, and the waveguide may be sequentially arranged below the reflection grating, and the projection system may be disposed below the light multiplication module.

The at least one positive lens may be disposed below the reflection grating of the light multiplication module, the second transmission grating, the waveguide, and the first transmission grating are sequentially disposed above the reflection grating, and the projection system may be disposed above the light multiplication module.

The waveguide may include a sector of a total internal reflection-based light transmission diffraction multi-radial direction waveguide.

The light multiplication module may further include a prism for in-coupling of light.

The first transmission grating, the second transmission grating, and the reflection grating may be recorded on a film, and may include a volume holographic grating deposited on a surface of the waveguide or a relief diffraction element formed on a surface of the waveguide.

The light multiplication module may have a shape of one disc sector, and may form a disc shape as a whole.

Each of the at least one positive lens may have a shape of one disc sector, a radius of the disk sector matches a radius of the light multiplication module, and a corresponding one of the at least one positive lens may be disposed on the light multiplication module.

The at least one positive lens may form a circular lens array as a whole.

Each of the at least one positive lens may be disposed on the light multiplication module with a gap.

The gap may be filled with an optical material layer.

Each of the at least one positive lens may have a shape matching a shape of a corresponding light multiplication module.

The at least one positive lens may have one of a cut-away circular sector shape, a polygonal shape, and a circular shape.

The waveguide may include a transparent material with respect to a spectrum of a visible light region.

The light multiplication module may be configured to perform radial direction multiplication of a decoupling aperture of the projection system.

One of anti-reflective coating, semi-reflective coating, a dichroic filter, a neutral filter, and a diffraction optical element may be provided on a surface of the waveguide.

The light multiplication module may be configured to multiply light of at least one specific color.

The waveguide may have one of shapes including a sphere, a torus, a rectangular parallelepiped, a disc, and a star.

The at least one positive lens may include one of a Fresnel lens and a dynamic lens.

According to an embodiment, a method of operating the above mid-air image display device may include: transmitting a beam forming an image from the projection system to the first transmission grating, the beam, as a result of diffraction at the first transmission grating, being split into a $1^{st}$ order diffraction beam and a $0^{th}$ order diffraction beam of the first transmission grating; transmitting the $0^{th}$ order diffraction beam of the first transmission grating to the second transmission grating, the $0^{th}$ order diffraction beam of the first transmission grating, as a result of diffraction at the second transmission grating, being split into a $1^{st}$ order diffraction beam and a $0^{th}$ order diffraction beam of the second transmission grating; transmitting the $1^{st}$ order diffraction beams of the first and second transmission gratings and the $0^{th}$ order diffraction beam of the second transmission grating to the waveguide; allowing the $1^{st}$ order diffraction beams of the first and second transmission gratings transmitted to the waveguide at an angle corresponding to a total internal reflection angle range to be reflected at an interface between air and the first transmission grating and an interface between the waveguide and the reflection grating, thereby to propagate along the waveguide to form another $1^{st}$ order diffraction beam at the second transmission grating as a result of diffraction of the $1^{st}$ order diffraction beam of the first transmission grating at the waveguide, and to form another $1^{st}$ order diffraction beam at the first transmission grating as a result of diffraction of the $1^{st}$ order diffraction beam of the second transmission grating at the waveguide; diffracting, by the reflection grating, the other $1^{st}$ order diffraction beam of the second transmission grating and the other $1^{st}$ order diffraction beam of the first transmission grating to be out-coupled to the positive lens through the waveguide, the second transmission grating, and the first transmission grating; and refracting the out-coupled beams and focusing a mid-air image on a focal plane, by the positive lens.

The $0^{th}$ order diffraction beam of the second transmission grating may pass through the waveguide above the reflection grating, the $0^{th}$ order beam of the second transmission grating may be split into a $1^{st}$ order diffraction beam and a $0^{th}$ order diffraction beam of the reflection grating, and then the $0^{th}$ order diffraction beam of the reflection grating may be not considered.

The $1^{st}$ order diffraction beam of the reflection grating may pass through the waveguide, the second transmission grating, and the first transmission grating, and reflected back to the waveguide due to total internal reflection in a surface of the first transmission grating, and the $1^{st}$ order diffraction beam of the reflection grating may be transmitted to the first transmission grating, and, as a result of diffraction at the first transmission grating, may be split into still another $1^{st}$ order diffraction beam and another $0^{th}$ order the diffraction beam of the first transmission grating.

The light multiplication module may be configured to allow the mid-air image to be viewed only within a range perpendicular to the mid-air image display device.

The light multiplication module may be configured to allow the mid-air image to be viewed both in a range perpendicular to the mid-air image display device and in a range deviated from the range perpendicular to the mid-air image display device.

According to an embodiment, a mid-air image display device may include: a projection system configured to output a light beam for an image; a second positive lens disposed below the projection system; a light multiplication module configured to receive the light beam output from the projection system; a first positive lens and a second positive lens disposed below and above the light multiplication module, respectively, and configured to receive the light beam transmitted through the light multiplication module to form a mid-air image, wherein the light multiplication module may include: a reflection grating disposed above the first positive lens; a waveguide disposed above the reflection grating; a second transmission grating disposed above the waveguide; a first transmission grating disposed above the second transmission grating and below the second positive lens.

According to an embodiment, a method for operating the mid-air image display device may include following operations: A) transmitting a beam forming an image from the projection system to the first transmission grating, the beam, as a result of diffraction at the first transmission grating, being split into a $1^{st}$ order diffraction beam and a $0^{th}$ order diffraction beam of the first transmission grating; B) transmitting the $0^{th}$ order diffraction beam of the first transmission grating to the second transmission grating, the $0^{th}$ order diffraction beam of the first transmission grating, as a result of diffraction at the second transmission grating, being split into a $1^{st}$ order diffraction beam and the $0^{th}$ order diffraction beam of the second transmission grating; C) transmitting the $1^{st}$ order diffraction beams of the first and second transmission gratings and the $0^{th}$ order diffraction beam of the second transmission grating to the waveguide; D) allowing the $1^{st}$ order diffraction beams of the first and second transmission gratings transmitted to the waveguide at an angle corresponding to a total internal reflection angle range to be reflected at an interface between air and the first transmission grating and an interface between the waveguide and the reflection grating, thereby to propagate along the waveguide to form another $1^{st}$ order diffraction beam at the second transmission grating as a result of diffraction of the $1^{st}$ order diffraction beam of the first transmission grating at the waveguide, and to form another $1^{st}$ order diffraction beam at the first transmission grating as a result of diffraction of the $1^{st}$ order diffraction beam of the second transmission grating at the waveguide; E) diffracting, by the reflection grating, the other $1^{st}$ order diffraction beam of the second transmission grating and the other $1^{st}$ order diffraction beam of the first transmission grating to be out-coupled to the second positive lens through the waveguide, the second transmission grating, and the first transmission grating; and F) as the first positive lens forms a first mid-air image, focusing the out-coupled beams on a focal plane of the first positive lens, and as the second positive lens forms a second mid-air image, focusing the out-coupled beams on a focal plane of the second positive lens.

The $0^{th}$ order diffraction beam of the second transmission grating may pass through the waveguide above the reflection grating, the $0^{th}$ order beam of the second transmission grating may be split into a $1^{st}$ order diffraction beam and a $0^{th}$ order diffraction beam of the reflection grating, and then the $0^{th}$ order diffraction beam of the reflection grating may not be considered.

The 1$^{st}$ order diffraction beam of the reflection grating may pass through the waveguide, the second transmission grating, and the first transmission grating, and reflected back to the waveguide due to total internal reflection from an external surface of the first transmission grating, and the 1$^{st}$ order diffraction beam of the reflection grating may be transmitted to the first transmission grating, and, as a result of diffraction at the first transmission grating, is split into still another 1$^{st}$ order diffraction beam and another 0$^{th}$ order the diffraction beam of the first transmission grating, and then the operations (B)-(F) may be repeated.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
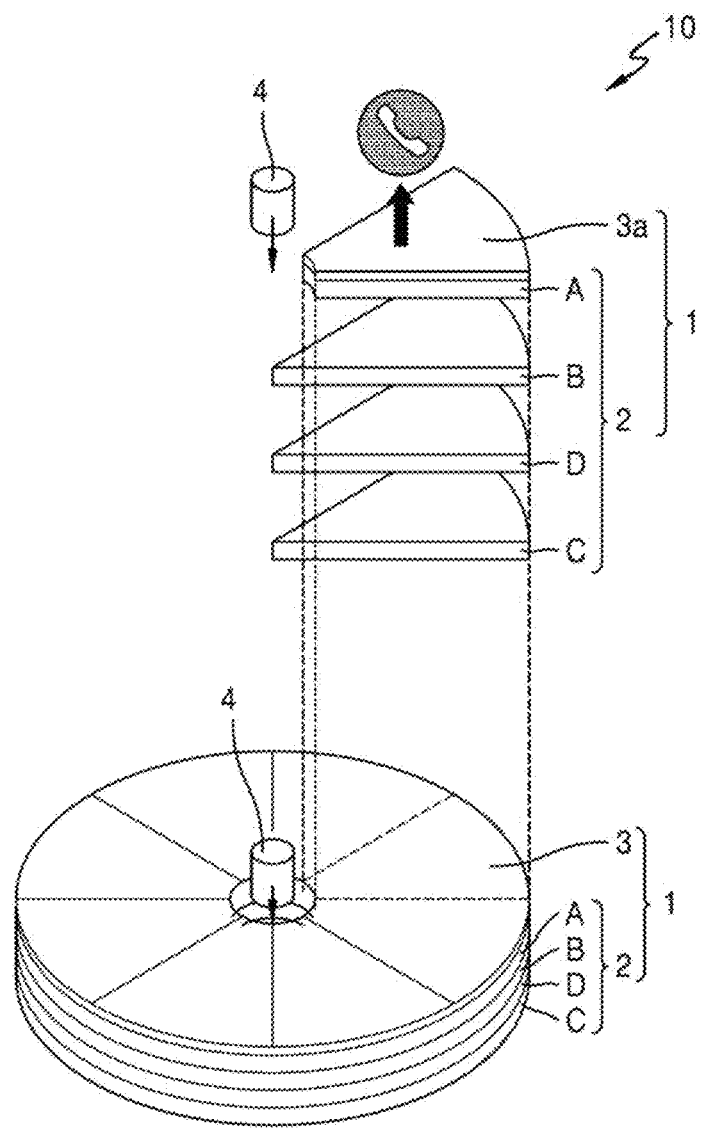
FIG. 1 illustrates a mid-air image display device according to an embodiment.

Hereinbelow, various embodiments are described with reference to the accompanying drawings. However, this is not intended to limit the disclosure to particular modes of practice, and it is to be appreciated that various modifications, equivalents, and/or alternatives that do not depart from the spirit and technical scope are encompassed in the disclosure. In relation to the description of the drawings, like reference numerals denote like constituent elements.

Electronic apparatuses according to various embodiments in the disclosure may be various types of apparatuses. The electronic apparatus may include, for example, portable communication devices (e.g., smartphones), computer devices, portable multimedia devices, portable medical devices, cameras, wearable devices, or home appliance devices. The electronic apparatus according to an embodiment is not limited to the above-described devices.

Various embodiments and terms used therein are not intended to limit the disclosure to particular modes of practice, and it is to be appreciated that all changes, equivalents, and substitutes that do not depart from the spirit and technical scope are encompassed in the disclosure In connection with the description of the drawings, similar reference numerals may be used for similar or related constituent elements. The singular form of a noun corresponding to an item may include one or more items, unless the relevant context clearly states otherwise. In the specification, the expressions such as "A or B," "at least one of A and/or B," or "at least one or more of A and/or B" may include all available combinations of items listed together. Terms such as "first" and "second" are used herein merely to describe a variety of constituent elements, but the constituent elements are not limited by the terms and do not limit the constituent elements on different aspects (e.g., importance or order). When some (e.g., first) constituent element is "coupled" or "connected" to another (e.g., second) constituent element, with or without the terms "functionally" or "communicatively," it means that the certain constituent element can be connected to the other constituent element directly (e.g., by wired), wirelessly, or through a third constituent element.

The term "module" used in various embodiments may denote a unit including one or two or more combinations of, for example, hardware, software, or firmware. The module may be interchangeably used with terms for example, units, logics, logical blocks, components, or circuits. The module may be a minimum unit of a part that is integrally formed or a part thereof, or may be a minimum unit performing one or more functions or a part thereof. For example, according to an embodiment, a module may be embodied in the form of an application-specific integrated circuit (ASIC).

Various embodiments may be embodied as software containing one or more instructions stored in a machine. For example, the processor of the machine may call at least one command among one or more instructions stored from a storage medium, and execute them. This enables the machine to be operated to perform at least one function according to the called at least one command. The one or more instructions may include a code generated by a compiler or a code executable by an interpreter. The machine-readable storage medium may be provided in the form of a non-transitory storage medium. Here, "non-transitory" merely means that the storage media do not contain signals and are tangible, but do not distinguish data being semi-permanently or temporarily stored in the storage media.

According to an embodiment, the operation method of an electronic device according to the disclosed embodiments may be provided by being included in a computer program product. A computer program product as goods may be dealt between a seller and a buyer. The computer program product may be distributed in the form of a machine-readable storage medium (e.g., a compact disc read only memory (CD-ROM)) or may be distributed (e.g., downloaded or uploaded) online through an application store (e.g., Play Store™) or directly between two user apparatuses. In the case of online distribution, at least part of a computer program product (e.g., a downloadable application) may be at least temporarily stored or may be temporarily created on a storage medium such as a memory of a manufacturer's server, an application store's server, or a memory of a relay server.

According to various embodiments, each constituent element (e.g., module or program) of the above-mentioned constituent elements may include a singular or a plurality of entities, and some of the plurality of entities may be separately disposed on other constituent elements. According to various embodiments, among the above-described constituent elements, one or more constituent elements or operations may be omitted, or one or more other constituent elements or operations may be added. Alternatively or additionally, a plurality of constituent elements (e.g., module or program) may be integrated into one constituent element. In this case, the integrated constituent element may perform one or more functions of the constituent element of each of the plurality of constituent elements that are performed by the corresponding constituent element of the plurality of constituent elements prior to the integration, in the same or similar manner. According to various embodiments, operations performed by a module, program or other constituent element are executed sequentially, parallel, iteratively, or heuristically, or one or more of the operations are executed in a different order, or omitted, or one or more other operations can be added. In the disclosure, the term "user" may refer to a person using an electronic apparatus or a device using the electronic apparatus (e.g., artificial intelligence electronic apparatus).

FIG. 1 schematically illustrates a mid-air image display device according to an embodiment. The mid-air image display device 10 may include at least one light multiplication module 2, at least one positive lens 3, and a projection system 4 for forming an image. The at least one positive lens 3 refers to a lens having a positive refractive power.

The at least one light multiplication module 2 may include a first transmission grating A, a second transmission grating B, at least one waveguide D, and a reflection grating C. The at least one positive lens 3 may be disposed on the at least one light multiplication module 2. Hereinbelow, the first transmission grating A, the second transmission grating B, and the reflection grating C may be referred to as at least one diffraction grating.

The mid-air image display device 10 according to the present embodiment displays a mid-air image in a free space so that the mid-air image may be viewed at a position apart from the mid-air image to a degree at a particular field of view (FoV) with a naked eye. An embodiment may be embodied through a combination of a waveguide, a diffraction optical element (DOE), a monocentric projection optical system, and a focus lens array. The mid-air image display device 10 according to the present embodiment has a compact size, and may display a magnified image compared to an image provided by a projection system, and the displayed image may be disposed in a space and may provide an extended FoV of a mid-air image. An image may be equal to a ratio of a focal length of a lens of a projection system to a focal length of a focusing lens forming the image, or magnified by multiple times. While having a high image quality and a positive image offset, the mid-air image display device 10 has no moving structural component and no need to provide an additional scattering medium for display.

In the specification, the term "mid-air image" may mean that an image is apart by some distance from a mid-air image apparatus. In other words, an image may be disposed between a display aperture and an observer, and the observer may view the image in mid-air. When a scattering medium, for example, a diffusive film, is disposed on an image plane, a reproduced mid-air image may be clearly viewed on the diffusive film.

The term "positive offset" of an image may mean that a mid-air image is disposed between a formation decoupling aperture of the mid-air image display device 10 and the observer.

The extended FoV of a mid-air image may mean that a mid-air image may be viewed within a wide FoV. In other words, as an image is viewed only within an aperture of the mid-air image display device 10, the larger a display aperture is, the wider the FoV of a mid-air image is.

The mid-air image display device 10 according to the present embodiment does not need an additional scattering medium to show an image in a free space. Furthermore, the mid-air image display device 10 according to the present embodiment may be used for or implemented in various types of compact devices having a display such as smartphones, smart watches, etc. For example, when operated with a virtual assistants, the mid-air image display device 10 according to the present embodiment may be used in a non-compact display device in TV projector.

In the mid-air image display device 10, a diffractive multi-directional radiating waveguide D may be used, and light may be in-coupled at a center of the diffractive multi radial directional waveguide D into the inside of the diffractive multi-directional radiating waveguide D, according to an embodiment. A small aperture of the projection system 4 is increased to all directions to fill the entire aperture of the diffractive multi-directional radiating waveguide D. The diffractive multi-directional radiating waveguide D may include a diffraction grating so that the mid-air image display device 10 may have a compact size.

As illustrated in FIG. 1, the at least one positive lens 3 may be divided into, for example, a plurality of sectors 3a, and the sectors 3a may be arranged in the form of a circular array. The diffractive multi-directional radiating waveguide D may be integrated with the at least one positive lens 3 in a circular array, each of the sectors 3a of the at least one positive lens 3 may have a FoV, and the FoV of each of the sectors 3a of the at least one positive lens 3 may be connected to the FoVs of neighboring sectors 3a of the at least one positive lens 3 that neighbor. Accordingly, a user may view a mid-air image within an azimuth of up to 360°.

The mid-air image display device 10 may include the at least one light multiplication module 2. The at least one light multiplication module 2 each may include at least three diffraction gratings and the diffractive multi-directional radiating waveguide D. The at least three diffraction gratings are stacked to form a stack, and may perform a light in-coupling/out-coupling function. The at least three diffraction gratings may include the first transmission grating A, the second transmission grating B, and the reflection grating C. The first transmission grating A, the second transmission grating B, and the reflection grating C may form a stack of diffraction gratings. The diffractive multi-directional radiating waveguide D is a light transmission device based on total internal reflection, and may be, for example, a diffractive multi-directional radiating waveguide. The diffractive multi-directional radiating waveguide D may be arranged in contact with one of the first transmission grating A, the second transmission grating B, and the reflection grating C.

The at least one positive lens 3 may each be disposed on the at least one light multiplication module 2. The at least one positive lens 3 and the at least one light multiplication module 2 corresponding thereto may constitute an at least one image forming module 1.

The projection system 4 may be arranged to provide an image at the same angle with respect to each of the at least one image forming module 1. When the projection system 4 provides an image at the same angle with respect to each of the at least one image forming module 1, a mid-air image formed by each of the at least one image forming module 1 may be lined up in a free space in the form of a uniform ring. When an image is provided at different angles, the formed mid-air images may generate a shape of an irregular shape. For a uniform ring, users may view a mid-air image that is smoothly transmitted from the sectors of the at least one image forming module 1. However, when mid-air images are provided at different angles, a phenomenon in which mid-air images jump when moving between the sectors may occur.

However, the projection system 4 may request the at least one image forming module 1 to provide images at different angles. Accordingly, the projection system 4 may supply an image to each of the at least one image forming module 1.

The waveguide D may operate like a compact telescope with 1× magnification. In other words, light incident on the diffractive multi-directional radiating waveguide D may exit from the diffractive multi-directional radiating waveguide D at the same angle as an incident angle on the diffractive multi-directional radiating waveguide D, and an optical aperture in the output of the mid-air image display device 10 may be greater than an optical aperture in the input of the mid-air image display device 10 due to the diffraction in the first transmission grating A, the second transmission grating B, and the reflection grating C and the multiple reflection in the diffractive multi-directional radiating waveguide D.

A small-sized image, which is an original image, may be input to the mid-air image display device 10, and multiplied through the multiple reflection by the first transmission grating A, the second transmission grating B, and the reflection grating C.

A mid-air image may be formed around a focal plane of the at least one positive lens 3, and the mid-air image may be enlarged compared to the original image. This is because the focal length of the at least one positive lens 3 is several times greater than the focal length of a lens of the projection system 4.

Due to the total reflection operation of the diffractive multi-directional radiating waveguide D, the mid-air image display device 10 may have a compact dimension and provide a mid-air image of an extended FoV.

As the at least one positive lens 3 is used for light out-coupling, a mid-air image may be formed on an image plane of the at least one positive lens 3, that is, at a particular distance from the at least one positive lens 3, and thus, the FoV may be increased up to 360°, image quality may be improved, and an overall dimension of an image may be reduced. As in the general case, an azimuth angle may be appreciated as an angle measured between a direction with respect to an object (in this case, an image) and a direction with respect to a reference object. For example, when the north is a 0° azimuth angle, the east may be a 90° azimuth angle, the south may be a 180° azimuth angle, and the west may be a 270° azimuth angle, and a 360° azimuth angle may refer to completely rotating an image counterclockwise.

The diffractive multi-directional radiating waveguide D based on total internal reflection (TIR) may be a radiation type waveguide. The first transmission grating A, the second transmission grating B, and the reflection grating C may be recorded on a film and may be a volume holographic (Bragg) grating that is deposited on a surface of the diffractive multi-directional radiating waveguide D or a relief diffraction element formed on a surface of the diffractive multi-directional radiating waveguide D.

The diffractive multi-directional radiating waveguide D may be manufactured of a transparent transmission optical material in a spectrum of a visible range. The material may be transparent glass, polymer, photonic crystal in a spectrum of a visible range, but the disclosure is not limited thereto.

Figure 2:
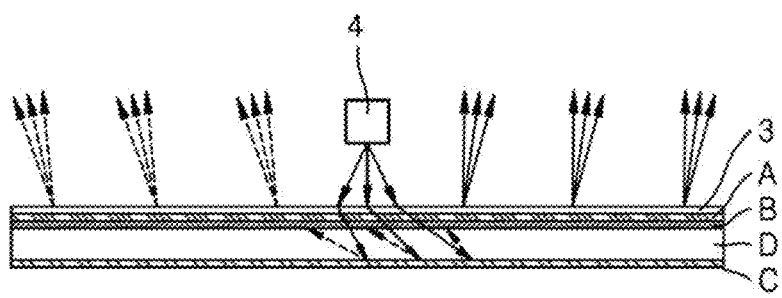
FIG. 2 is a cross-sectional view of a mid-air image display device, according to an embodiment.

FIG. 2 is a cross-sectional view of the mid-air image display device 10, according to an embodiment. The at least one light multiplication module 2 may be of a radiation type. In other words, the at least one light multiplication module 2 may implement all-round multiplication of a decoupling aperture of the projection system 4. In an embodiment, the diffractive multi-directional radiating waveguide D may be arranged between the reflection grating C and the two transmission gratings A and B. The projection system 4 may be arranged at the center of the at least one light multiplication module 2.

Figure 3:
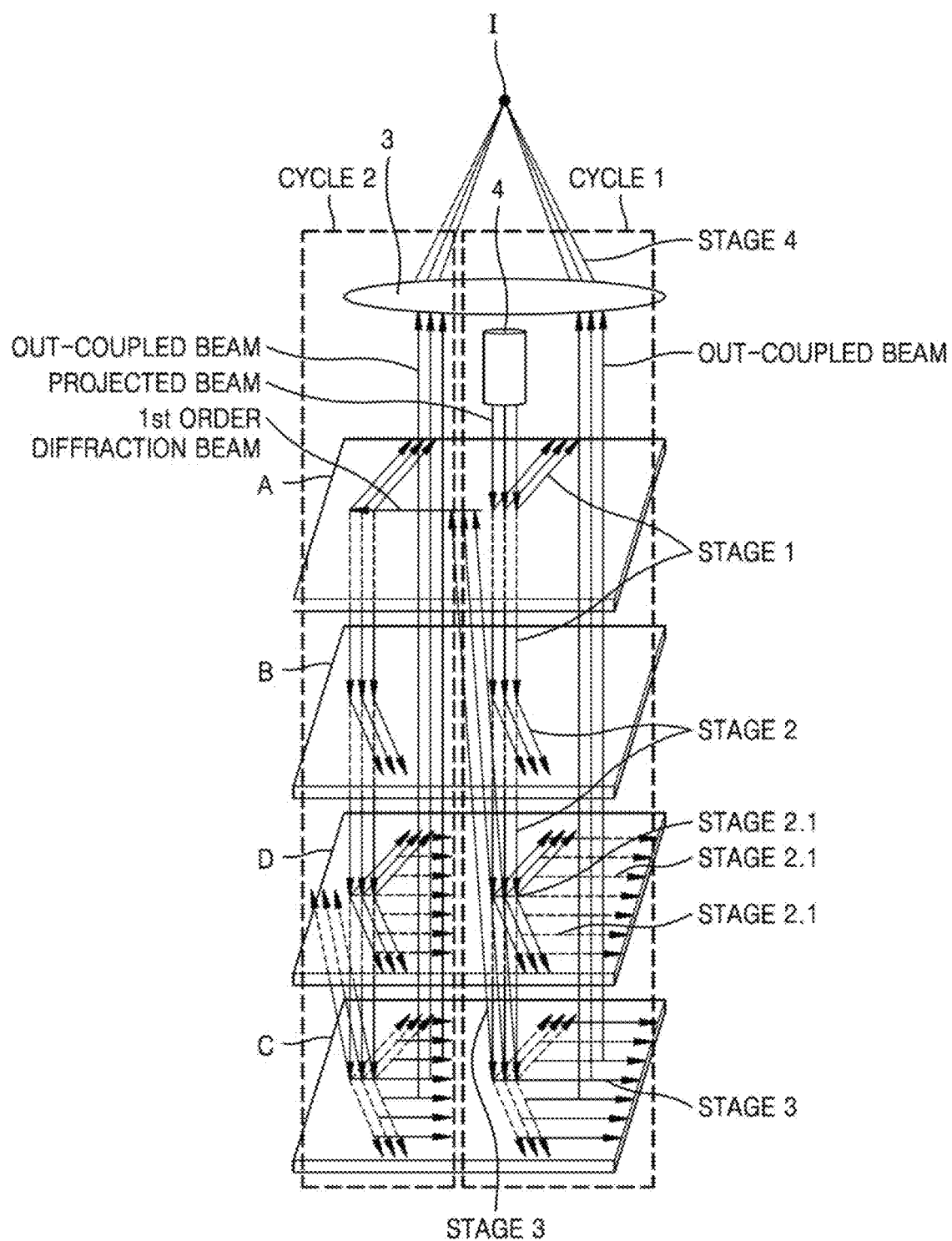
FIG. 3 is a view for explaining an operation of a mid-air image display device, according to an embodiment.

FIG. 3 illustrates an operation of the mid-air image display device 10, that is, propagation of a beam and formation of a mid-air image in the mid-air image display device 10. A process of forming a mid-air image is described in detail. Referring to FIG. 3, the projection system 4 may be provided between the at least one positive lens 3 and the first transmission grating A.

<Stage 1>

A beam, that is, each point of an image, from the projection system 4 corresponding to an image "at infinity" may be obtained by one of parallel beams incident on the first transmission grating A. The following physical effects may be obtained. As light from the projection system 4 may propagate toward the diffractive multi-directional radiating waveguide D through the first transmission grating A and the second transmission grating B, refraction of light may occur at an air/material interface of the first transmission grating A, and diffraction may occur in the first transmission grating A. Actually, 100% efficiency of a diffraction grating is impossible to achieve, and a beam may be split into two beams of a $1^{st}$ order diffraction beam (a) and a $0^{th}$ order diffraction beam, that is not diffracted, at the first transmission grating A. A direction of the diffraction beam may be determined by orientation of the first transmission grating A. For example, a grating vector of the first transmission grating A is assumed to be +120° with respect to an horizontal axis.

<Stage 2>

As the $0^{th}$ order beam of the first transmission grating A reaches an interface between media of the first transmission grating A and the second transmission grating B, this beam refracts at the interface between the media, and the refracted beam may diffract in the second transmission grating B. In this case, two beams of a $1^{st}$ order diffraction beam (b) and a $0^{th}$ order beam that is not diffracted may be formed. A direction of a diffraction beam may be determined by orientation of the second transmission grating B. For example, a grating vector of the second transmission grating B is assumed to be −120° with respect to a horizontal axis.

After passing through the second transmission grating B, the $1^{st}$ order diffraction beams (a), (b) and the $0^{th}$ order diffraction beam reaches an interface between media of the second transmission grating B and the diffractive multi-directional radiating waveguide D, and light refraction occurs at an interface between the media.

<Stage 2.1>

A $0^{th}$ order diffraction beam that is not diffracted may pass through the diffractive multi-directional radiating waveguide D to the reflection grating C with refraction (Stage 2.1 of FIG. 3). The $1^{st}$ order diffraction beams (a) and (b) are in-coupled in the diffractive multi-directional radiating waveguide D, a beam having an incident angle of a threshold angle or more is reflected again between two interfaces of the media, that is, at an interface between air and the first transmission grating A, and an interface between the diffractive multi-directional radiating waveguide D, and the reflection grating C. The threshold angle may be determined considering refractive indexes of materials of the reflection grating C and the diffractive multi-directional radiating waveguide D. As the beams pass in multiple through the first transmission grating A and the second transmission grating B, the beams propagate through the diffractive multi-directional radiating waveguide D. The beams are illustrated in the diffractive multi-directional radiating waveguide D that propagates light to the right. As a result, the $1^{st}$ order diffraction beam (a) from the first transmission grating A may form a $1^{st}$ order diffraction beam (c) at the second transmission grating B, and the $1^{st}$ order diffraction beam (b) from the second transmission grating B may form a $1^{st}$ order diffraction beam (d) at the first transmission grating A.

<Stage 3>

The $1^{st}$ order diffraction beam (c) and the $1^{st}$ order diffraction beam (d) are diffracted by the reflection grating C, pass through the diffractive multi-directional radiating waveguide D, the second transmission grating B, and the first transmission grating A, and are out-coupled to the at least one positive lens 3 by refraction at each medium interface. Furthermore, the at least one positive lens 3 refracts the out-coupled beams, and focuses on a focal plane, forming a mid-air image. The process so far is referred to as Cycle 1.

The non-diffraction beam ($0^{th}$ order) reaches the reflection grating C, and the beam is split into a $1^{st}$ order diffraction beam (e) and a non-diffraction beam ($0^{th}$ order), and are reflected back to the projection system 4, thereby passing through the entire system by being refracted. Then, the beams are not considered. A grating vector of the reflection grating C is oriented in parallel with a horizontal axis.

The $1^{st}$ order diffraction beam (e) returns to the interface of air and the first transmission grating A by passing, with refraction, through the diffractive multi-directional radiating waveguide D, the second transmission grating B, and the first transmission grating A. Due to total reflection from an external surface of the first transmission grating A, the beams may be returned back to the diffractive multi-directional radiating waveguide D.

Next, the $1^{st}$ order diffraction beam (e) is incident on the first transmission grating A, and the process may be repeated. Thus, Cycle 2 starts.

When the reflection grating C is not present, there are only three propagation directions. In other words, there may be only 0 and +/−120° propagation directions. However, this is not sufficient to make a 360° display. Accordingly, the reflection grating C is needed to propagate light in six directions. The six directions may be formed by adding opposite directions to the three directions.

Thus, the beam from the projection system 4 may propagates along the diffractive multi-directional radiating waveguide D, and may be out-coupled.

<Stage 4>

The at least one positive lens 3 may refract the out-coupled beams and focus the beams on the focal plane so that a mid-air image may be formed between the at least one positive lens 3 and the observer. In this case, the at least one positive lens 3 may form not only a mid-air image, but also the FoV of the mid-air image. The FoV may depend on a back focal length and the aperture of the at least one positive lens 3.

The mid-air image display device 10 may have various geometrical shapes, for example, a sphere, a torus, a rectangular parallelepiped, a disc, a star, and the like.

Furthermore, optical coating may be applied to at least one surface of the diffractive multi-directional radiating waveguide D. For example, the optical coating may include anti-reflective coating to improve contrast/image quality, semi-reflective coating to form an image on opposite surfaces of the diffractive multi-directional radiating waveguide D, a dichroic filter for optional transmission of a light wavelength of a small range, a neutral filter, an additional diffraction optical element to change a wavefront of the out-coupled beams from the diffractive multi-directional radiating waveguide D, and the like. The additional diffraction optical element may operate like a lens that deflect the out-coupled beams from the diffractive multi-directional radiating waveguide D in any direction. Such coating may be applied to a lateral portion of the diffractive multi-directional radiating waveguide D where no diffraction optical element exists.

Figure 4A:
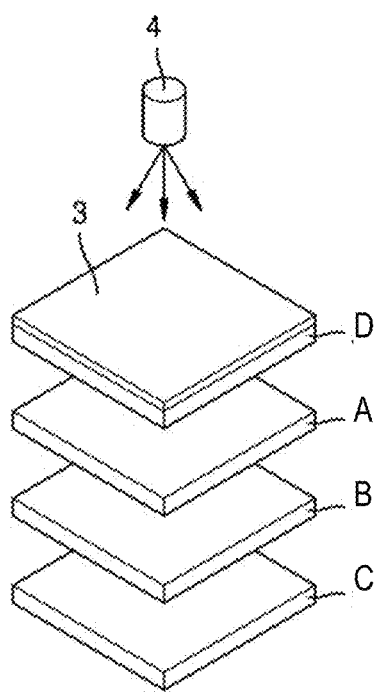
FIGS. 4A, 4B, and 4C illustrate various arrangement structures of a mid-air image display device, according to embodiments.
Figure 4B:
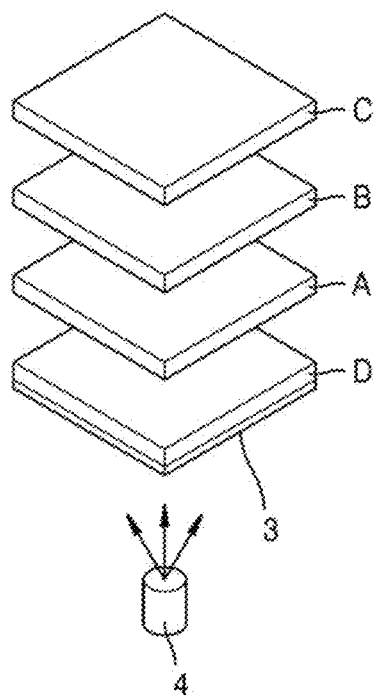
Figure 4C:
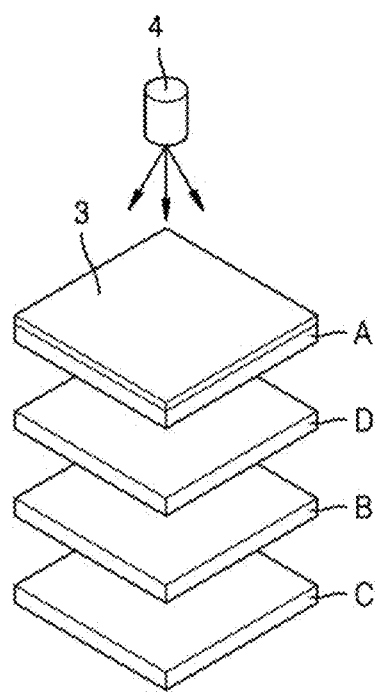

FIGS. 4A, 4B, and 4C illustrate modifications of an array of constituent elements of the mid-air image display device 10, according to embodiments.

Light propagation by a modified device illustrated in FIGS. 4A, 4B, 4C is similar to the light propagation of the embodiment of the device illustrated in FIG. 3. A difference therebetween lies in that locations of the three diffraction gratings A, B, and C with respect to the diffractive multi-directional radiating waveguide D are different. The locations of the three diffraction gratings A, B, and C may be determined based on an available use place of the mid-air image display device 10, for example, the device illustrated in FIG. 4B may project a mid-air image in a downward direction from a ceiling.

In the mid-air image display device 10 of FIG. 4A, the projection system 4 is disposed above the at least one positive lens 3, and the diffractive multi-directional radiating waveguide D, the first transmission grating A, the second transmission grating B, and the reflection grating C may be sequentially disposed below the at least one positive lens 3.

In the mid-air image display device 10 of FIG. 4B, the projection system 4 is disposed below the at least one positive lens 3, and the diffractive multi-directional radiating waveguide D, the first transmission grating A, the second transmission grating B, and the reflection grating C may be sequentially disposed above the at least one positive lens 3.

In the mid-air image display device 10 of FIG. 4C, the projection system 4 is disposed above the at least one positive lens 3, and the first transmission grating A, the diffractive multi-directional radiating waveguide D, the second transmission grating B, and the reflection grating C may be sequentially disposed below the at least one positive lens 3. In the present embodiment, all surfaces of the diffractive multi-directional radiating waveguide D are connected to the first transmission grating A and the second transmission grating B, additional coating may not be applied to the diffractive multi-directional radiating waveguide D.

Figure 5A:
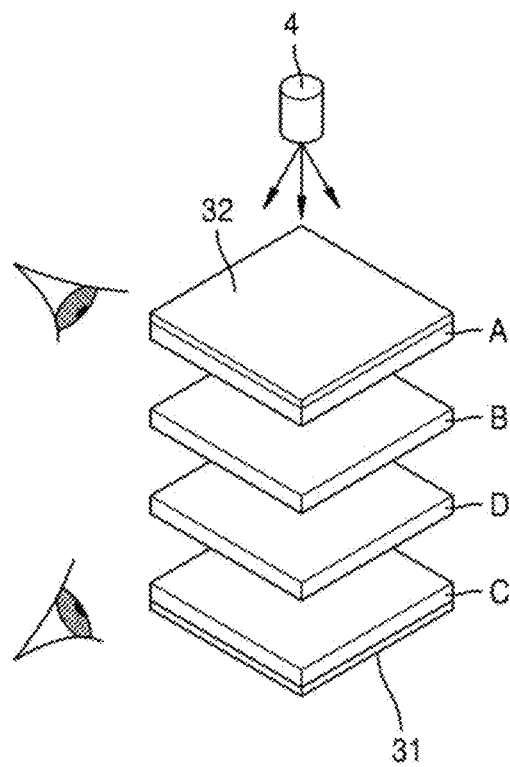
FIG. 5A illustrates an example in which a mid-air image display device includes two positive lenses.

Referring to FIG. 5A, the mid-air image display device 10 according to an embodiment may include a first positive lens 31, the reflection grating C disposed above the first positive lens 31, the diffractive multi-directional radiating waveguide D disposed above the reflection grating C, the second transmission grating B disposed above the diffractive multi-directional radiating waveguide D, the first transmission grating A disposed above the second transmission grating B, a second positive lens 32 disposed above the first transmission grating A, and the projection system 4 disposed above the second positive lens 32. In the present embodiment, an image I may be displayed at both of one side of the mid-air image display device 10 and the opposite side thereto. An image may be viewed at the side surface of the first transmission grating A and the opposite side of the mid-air image display device 10, that is, the side surface of the reflection grating C. In this case, the reflection grating C may have the partially light transmission properties. In other words, the reflection grating C may partially transmit light and partially reflect light. Light from both sides of the mid-air image display device 10 may be out-coupled due to the partial light transmission by the reflection grating C.

Figure 5B:
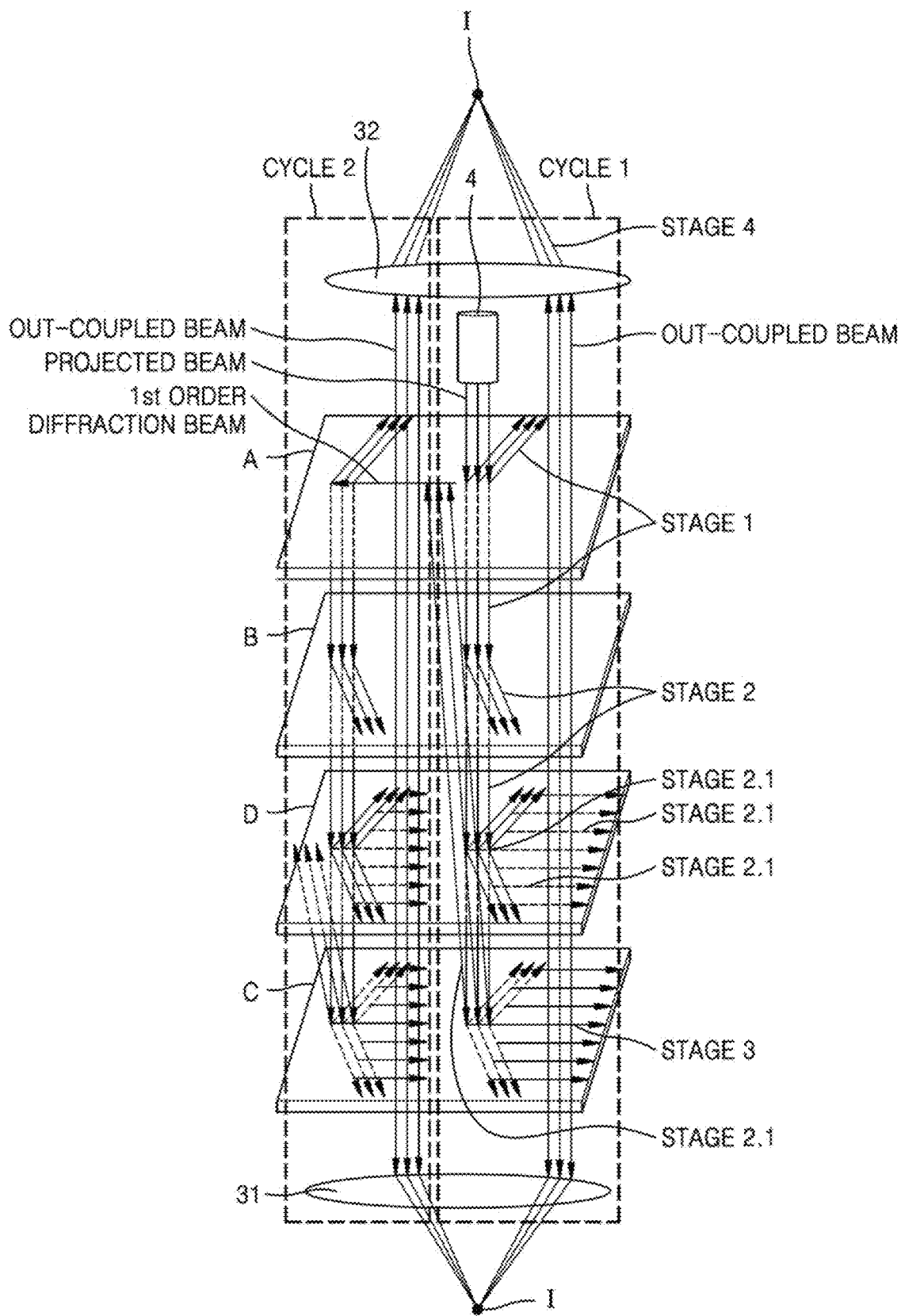
FIG. 5B is a view for explaining an operation in a case in which a mid-air image display device includes two positive lenses, according to an embodiment.

FIG. 5B illustrates a path of a beam by an array of the respective elements of the mid-air image display device 10 of FIG. 5A.

<Stage 1>

A beam from the projection system 4 corresponding to the "infinity" (in other words, each point of an image is obtained by a parallel beam) may propagate to the first transmission grating A. Here, the following physical effects may be obtained. Light may propagate from the projection system 4 to the diffractive multi-directional radiating waveguide D by passing through the first transmission grating A and the second transmission grating B. Light may be refracted at the interface between the media of air/the first transmission grating A, and light diffraction may occur in the first transmission grating A. The light may be split into a $1^{st}$ order beam (a) and a $0^{th}$ order non-diffraction beam. A direction of the diffraction beam may be determined by orientation of the first transmission grating A. For example, a grating vector of the first transmission grating A is assumed to be +120° with respect to an horizontal axis.

<Stage 2>

The $0^{th}$ order beam from the first transmission grating A may propagate to an interface between media of the first transmission grating A and the second transmission grating B, and the beam may be diffracted at the media interface, and then, diffracted by the second transmission grating B. In this case, two beams of a $1^{st}$ order diffraction beam (b) and a $0^{th}$ order non-diffraction beam may be formed. A direction of the diffracted beam may be determined by orientation of the second transmission grating B. For example, a grating vector of the second transmission grating B is assumed to be −120° with respect to a horizontal axis.

After passing through the second transmission grating B, the $1^{st}$ order diffraction beams (a) and (b) and the $0^{th}$ order diffraction beam reach an interface between the second transmission grating B and the diffractive multi-directional radiating waveguide D where light refraction occurs.

<Stage 2.1>

A $0^{th}$ order non-diffraction beam enters the reflection grating C (with refraction) through the diffractive multi-directional radiating waveguide D. While the $1^{st}$ order diffraction beams (a) and (b) are in-coupled into the diffractive multi-directional radiating waveguide D, with respect to all incident angles greater than a threshold angle, the beam is reflected again at the interface between the media (total internal reflection phenomenon). The threshold angle may be determined considering refractive indexes of materials of the reflection grating C and the diffractive multi-directional radiating waveguide D. The re-reflection may occur not only in the air/the first transmission grating A interface and the diffractive multi-directional radiating waveguide D/the reflection grating C interface, but also in the propagation along the diffractive multi-directional radiating waveguide D due to a multiple paths passing through the first transmission grating A and the second transmission grating B. As a result, the $1^{st}$ order diffraction beam (a) from the first transmission grating A may form the $1^{st}$ order diffraction beam (c) at the second transmission grating B, and the $1^{st}$ order diffraction beam (b) from the second transmission grating B may form the $1^{st}$ order diffraction beam (d) at the first transmission grating A.

<Stage 3>

The $1^{st}$ order diffraction beams (c) and (d) may be diffracted by the reflection grating C, and may be out-coupled to a second positive lens 32 through the diffractive multi-directional radiating waveguide D, the second transmission grating B, and the first transmission grating A. In this process, refraction may occur at each interface of media. Furthermore, the $1^{st}$ order diffraction beams (c) and (d) may be diffracted and out-coupled to the first positive lens 31 at the other side of the reflection grating C toward the first positive lens 31. The first positive lens 31 and the second positive lens 32 refract the out-coupled beams and focuses on a focal plane of a corresponding lens. Accordingly, two mid-air images may be formed at both sides of the mid-air image display device 10. The process so far may be referred to as Stage 3. Thus, Cycle 1 is terminated.

The $0^{th}$ order non-diffraction beam may propagate to the reflection grating C, and the beam may be split into a $1^{st}$ order diffraction beam (e) and a $0^{th}$ order diffraction beam. The two split beams may be reflected back to the projection system 4 and may pass through the entire device with refraction. Then, the beams are not considered. A vector of the reflection grating C is oriented in parallel with a horizontal axis.

The $1^{st}$ order diffraction beam (e) returns to the interface of air and the first transmission grating A by passing, with refraction, through the diffractive multi-directional radiating waveguide D, the second transmission grating B, the first transmission grating A. Due to total internal reflection from an external surface of the first transmission grating A, the beams may be reflected back to the inside of the diffractive multi-directional radiating waveguide D.

Then, the $1^{st}$ order diffraction beam (e) may propagate to the first transmission grating A, and the process may be repeated. Thus, Cycle 2 starts.

When the reflection grating C is not present, there are only three propagation directions (0 and +/−120°). However, this is not sufficient to make a 360° display. Accordingly, the reflection grating C may be used to propagate light in six directions. In other words, the reflection grating C may add three directions of the opposite directions.

Thus, the beam from the projection system 4 may propagates along the diffractive multi-directional radiating waveguide D, and may be out-coupled.

<Stage 4>

The first positive lens 31 and the second positive lens 32 may refract the out-coupled beams, and may form a mid-air image between the first positive lens 31 and the observer and between the second positive lens 32 and the observer, by focusing the respective beams on respective focal planes. In this case, the first positive lens 31 and the second positive lens 32 may form not only the mid-air image, but also a FoV thereof. The FoV may vary according to the apertures and the back focal lengths of the first positive lens 31 and the second positive lens 32.

The mid-air image display device 10 according to the present embodiment may display an image formed by the projection system 4 also at an opposite side of the projection system 4.

Figure 6A:
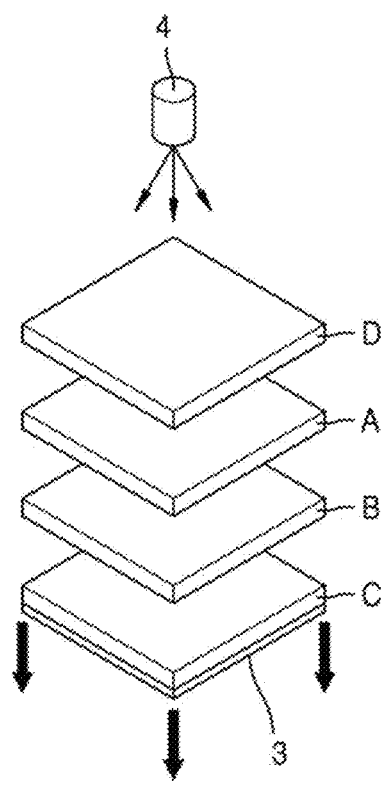
FIGS. 6A, 6B, and 6C illustrate various arrangement structures of a light multiplication module provided between a projection system and a positive lens, according to embodiments.
Figure 6B:
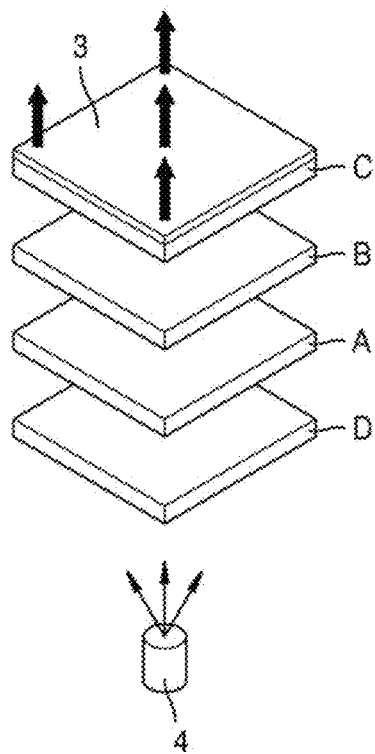
Figure 6C:
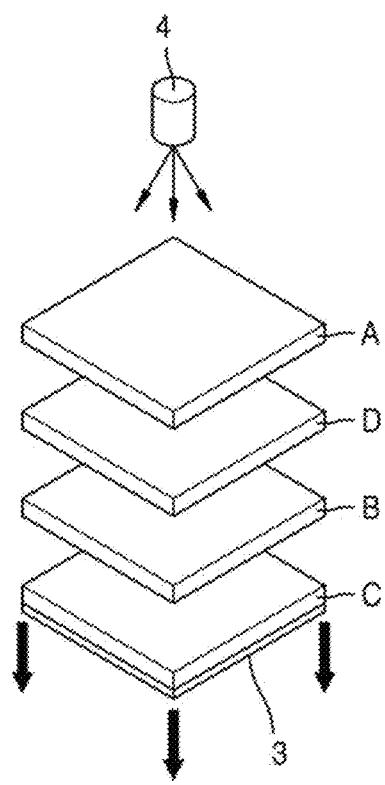

FIGS. 6A, 6B, and 6C illustrate examples of modifications of an array of the constituent elements of the mid-air image display device 10 when the projection system 4 and the formed image are disposed at opposite sides of the mid-air image display device 10. In these embodiments, the positions of the first and second transmission gratings A and B may be exchanged.

Referring to FIG. 6A, the reflection grating C may be disposed below the second transmission grating B, the at least one positive lens 3 may be disposed below the reflection grating C, the first transmission grating A may be disposed above the second transmission grating B, the diffractive multi-directional radiating waveguide D may be disposed above the first transmission grating A, and the projection system 4 may be disposed above the diffractive multi-directional radiating waveguide D. In this case, the mid-air image may be formed below the reflection grating (C). In the present embodiment, anti-glare coating, anti-reflective coating, and the like may be applied to the diffractive multi-directional radiating waveguide D. Thus, an image with improved contrast may be obtained.

Referring to FIG. 6B, the projection system 4 may be disposed below the diffractive multi-directional radiating waveguide D, the first transmission grating A may be disposed above the diffractive multi-directional radiating waveguide D, the second transmission grating B may be disposed above the first transmission grating A, the reflection grating C may be disposed above the second transmission grating B, and the at least one positive lens 3 may be disposed above the reflection grating C. In this case, the mid-air image may be formed above the reflection grating C. In the present embodiment, anti-glare coating, anti-reflective coating, and the like may be applied to the diffractive multi-directional radiating waveguide D. Thus, an image with improved contrast may be obtained. As such, the mid-air image may be formed above the reflection grating C by arranging the constituent elements as above.

Referring to FIG. 6C, the reflection grating C may be disposed below the second transmission grating B, the diffractive multi-directional radiating waveguide D may be disposed above the second transmission grating B, the first transmission grating A may be disposed above the diffractive multi-directional radiating waveguide D, and the projection system 4 may be disposed above the first transmission grating A. The at least one positive lens 3 may be disposed below the reflection grating C.

By arranging the constituent elements as above, the mid-air image may be formed below the reflection grating C. In this case, as the diffractive multi-directional radiating waveguide D is disposed between the first transmission grating A and the second transmission grating B, it is difficult to perform additional coating on the diffractive multi-directional radiating waveguide D.

As beam paths in the embodiments illustrated in FIGS. 6A to 6C are similar to the beam paths described with reference to FIG. 5B, a redundant description thereof is omitted.

Figure 7A:
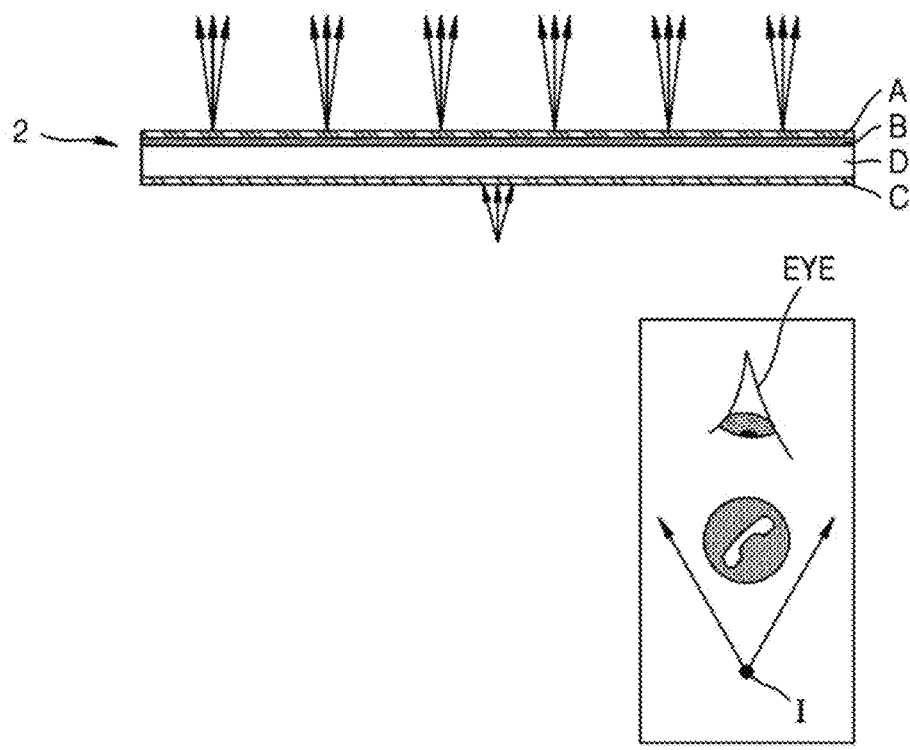
FIG. 7A illustrates that one mid-air image is formed in a mid-air image display device, according to an embodiment.

When the first transmission grating A, the second transmission grating B, and the reflection grating C are designed such that light beams are out-coupled at a vertical angle, a user, as illustrated in FIG. 7A, may view a mid-air image only within a range perpendicular to the mid-air image display device 10.

Figure 7B:
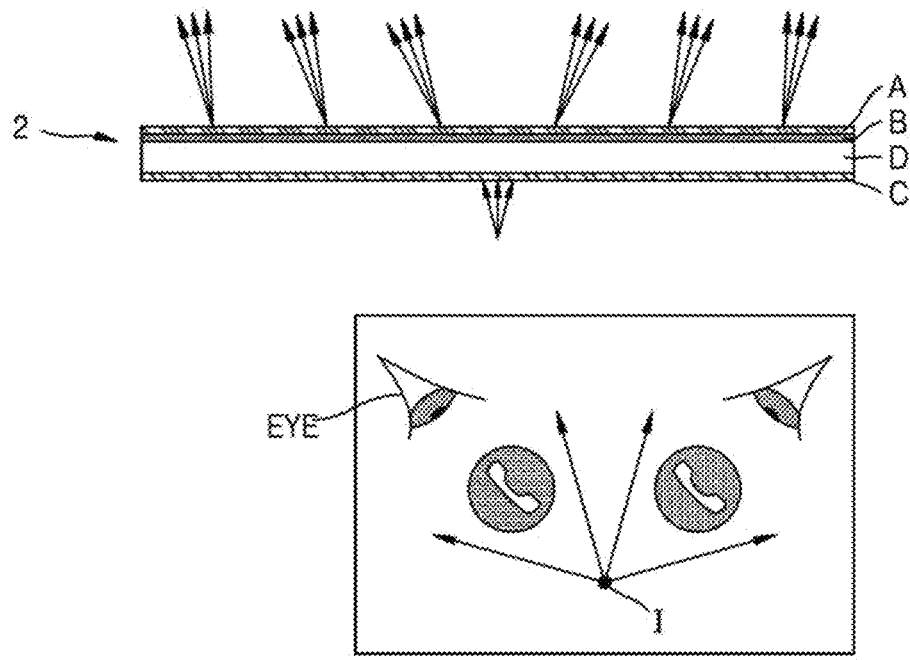
FIG. 7B illustrates that a plurality of mid-air images are formed in a mid-air image display device, according to an embodiment.

The diffraction gratings A, B and C may be configured such that light is out-coupled at a particular angle. In this case, as illustrated in FIG. 7B, the mid-air image may not be viewed in a ranged perpendicular to a device. In other words, the FoV on a vertical plane may be controlled by changing the configuration of the diffraction gratings A, B and C. In this case, when a smartphone is sufficiently away from a user, the user may still view the mid-air image.

Figure 8:
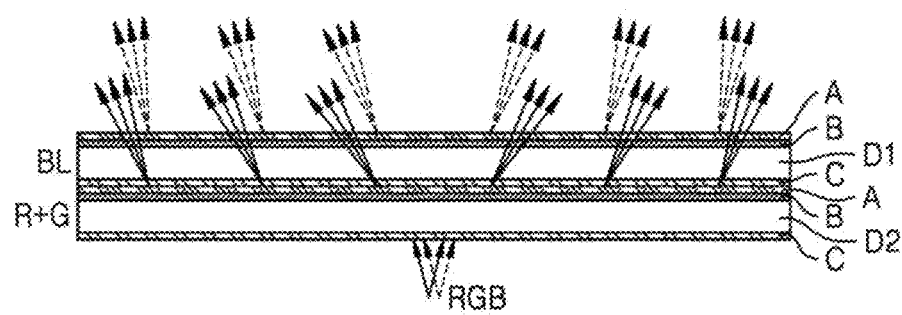
FIG. 8 illustrates a display device equipped with two sets of light multiplication modules, according to an embodiment.

As illustrated in FIG. 8, the mid-air image display device 10 according to an embodiment may additionally include at least one waveguide for transmitting light. The at least one waveguide may include, for example, a first waveguide D1 and a second waveguide D2. The first waveguide D1 and the second waveguide D2 may be disposed close to each other. When there are a plurality of waveguides, chromaticity of a mid-air image may be improved. Each waveguide may be in charge of a corresponding color. For example, as illustrated in FIG. 8, the first waveguide D1 may be in charge of propagation of blue light BL, and the second waveguide D2 may be in charge of propagation of red light (R) and green light (G).

Figure 9A:
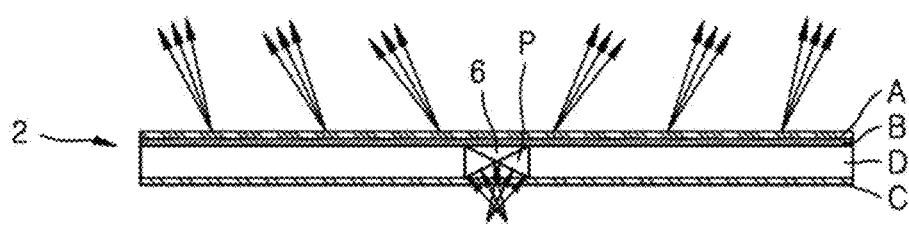
FIG. 9A illustrates a mid-air image display device including a prism, according to an embodiment.

Referring to FIG. 9A, a prism P may be provided at the center of the diffractive multi-directional radiating waveguide D. The prism P may be used for the in-coupling of light. The diffractive multi-directional radiating waveguide D may include a hole 6, and the prism P may be provided in the hole 6. The first transmission grating A, the second transmission grating B, and the reflection grating C may have a limited diffraction efficiency, and thus, a ratio of out-coupled light power of a diffraction beam of a desired dimension to in-coupled light power may be limited. The prism P may provide a higher efficiency than the in-coupled light through the diffraction gratings.

Figure 9B:
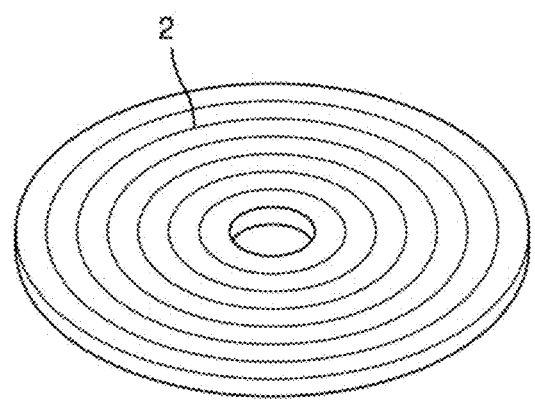
FIG. 9B illustrates a light multiplication module having a concentric structure, according to an embodiment.

Furthermore, as illustrated in FIG. 9B, the at least one light multiplication module 2 of the mid-air image display device 10 may has a radiation type structure of a radiation type waveguide and diffraction gratings having a concentric ring shape. By modifying the design of the diffractive multi-directional radiating waveguide D, the first transmission grating A, the second transmission grating B, and the reflection grating C, an image aperture may be increased in all directions, thereby increasing the FoV. In the present embodiment, light may proceed in a radial direction from the center so that the light may fill the entire decoupling aperture of the mid-air image display device 10.

The beam from the projection system 4 may form a FoV with a 360° range, and the beam passing through the prism P may be in-coupled to the diffractive multi-directional radiating waveguide D with the first transmission grating A, the second transmission grating B, and the reflection grating C. In this case, the first transmission grating A, the second transmission grating B, and the reflection grating C may be disposed at one surface of the diffractive multi-directional radiating waveguide D, as illustrated in FIGS. 6A and 6B. The diffraction and out-coupling of the light from the diffractive multi-directional radiating waveguide D may occur in a ring structure of each of the diffractive multi-directional radiating waveguide D with the first transmission grating A, the second transmission grating B, and the reflection grating C.

Figure 10:
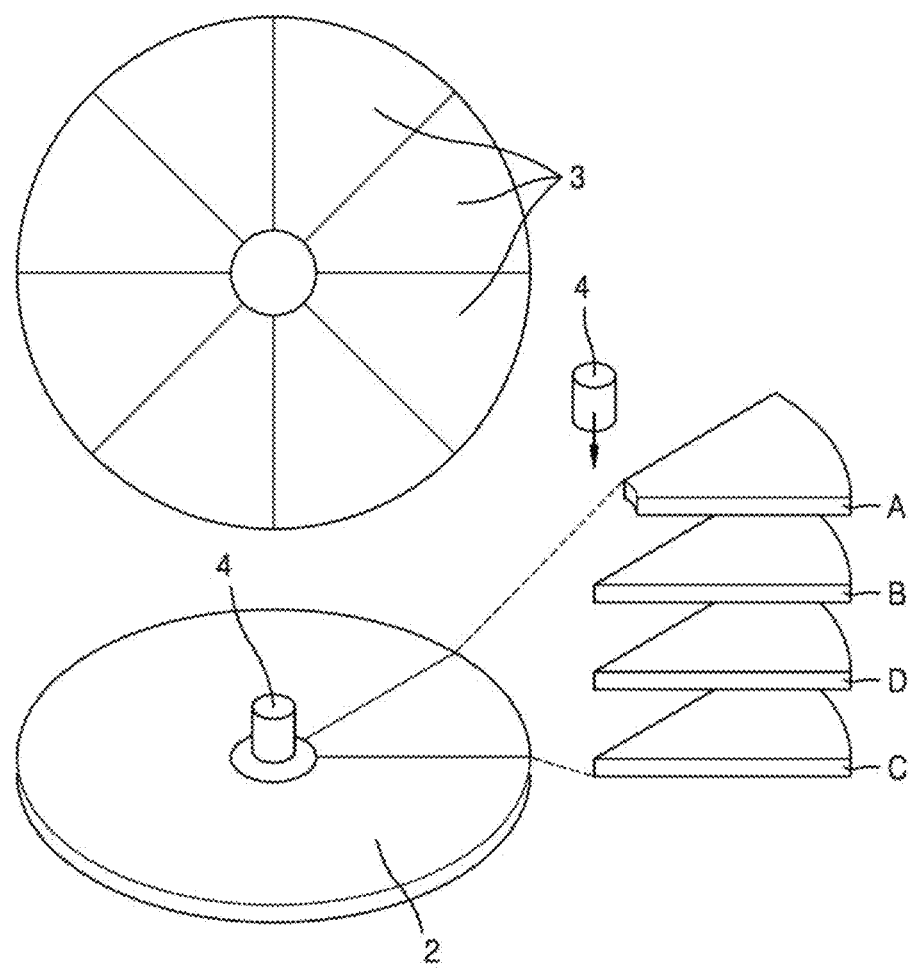
FIG. 10 illustrates a mid-air image display device, according to another embodiment.

As illustrated in FIG. 10, the at least one light multiplication module 2 may include the diffractive multi-directional radiating waveguide D, the first transmission grating A, the second transmission grating B, and the reflection grating C, and the at least one light multiplication module 2 may be disposed below an array of the at least one positive lenses 3.

When the diffractive multi-directional radiating waveguide D of a radial disc type is used, each of an array of the at least one positive lenses 3 may be a positive lens in a truncated fan shape. The light from the at least one light multiplication module 2 may be incident on each of the at least one positive lenses 3, and may focus near the focal plane of each of the at least one positive lens 3.

When the projection system 4 forms an image in infinity and the diffractive multi-directional radiating waveguide D has no distortion, the image may be accurately displayed on the focal plane of the at least one positive lens 3. However, as the projection system 4 is actually not ideal and is distorted, the image may be disposed near the focal plane.

Each constituent element of the at least one light multiplication module 2 and the at least one positive lens 3 may form a mid-air image and form a FoV of the mid-air image in part of a space determined by the focal length of the at least one positive lens 3. The FoV of a mid-air image may be fixed or variable with respect to a three-dimensional (3D) image, and the mid-air image may be viewed at a particular portion of the FoV.

Figure 11A:
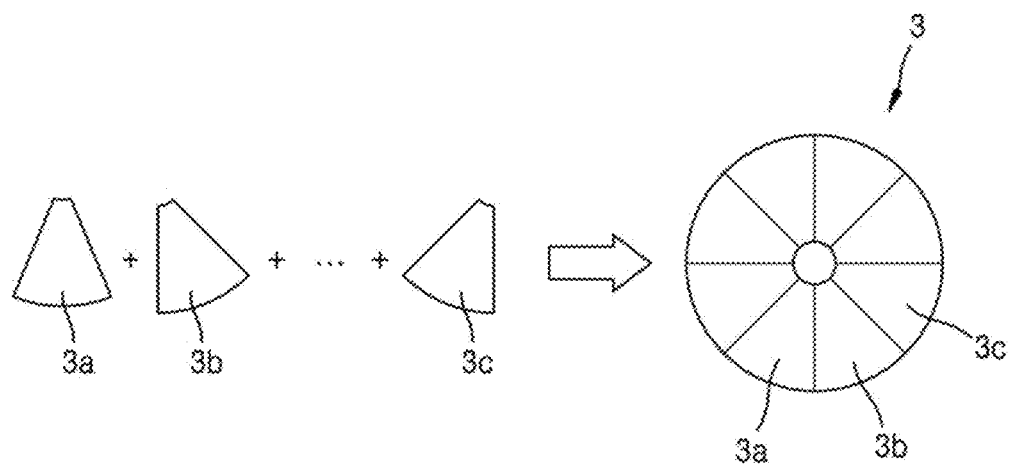
FIG. 11A illustrates an example of a positive lens array divided into a plurality of sector.
Figure 11B:
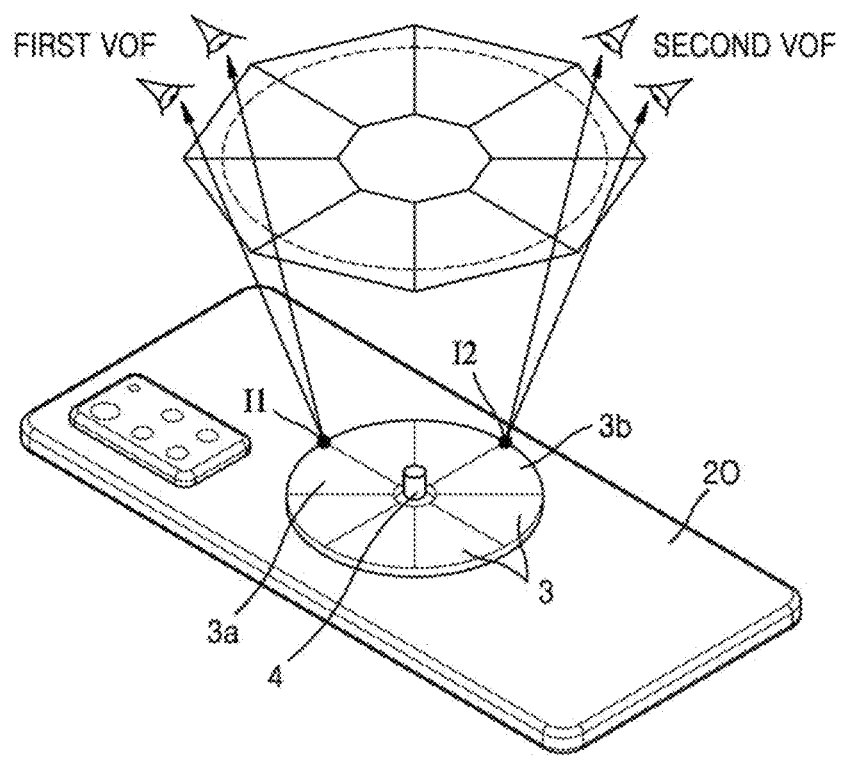
FIG. 11B illustrate that a mid-air image display device is applied to a mobile device to have an image having a 360° field of view, according to an embodiment.

As illustrated in FIGS. 11A and 11B, a combination of FoV regions is possible, several images are formed instead of one mid-air image, and mid-air images may be formed as many as the number of pieces of the at least one light multiplication module 2 with the at least one positive lens 3. Each mid-air image has a FoV region and may be displayed according to the location of each piece. In other words, when an image is viewed from around the mid-air image display device 10, a mid-air image from each corresponding piece may be displayed within a FoV of a user.

Accordingly, the azimuth angle of FoV may be changed, and an inclination of the displayed image may be changed. When a head/eye tracking system is used, an effect of viewing an image according to the location of the head or eye may be obtained. Furthermore, when a dynamic lens is used, a 3D mid-air image effect is obtainable.

As illustrated in FIG. 11A, the at least one positive lens 3 may include a plurality of sector lenses. The at least one positive lens 3 may include a first lens sector 3a, a second lens sector 3b, and a third lens sector 3c. When the at least one positive lens 3 is divided into a plurality of sectors, image quality may be improved by increasing a ratio of the focal length of the at least one positive lens 3 to a diameter of an aperture.

FIG. 11B illustrates an example in which the mid-air image display device 10 according to the above embodiments applies to a mobile phone 20. The at least one image forming module 1 in the form of a disc may be provided at a rear surface of the mobile phone 20, and an image formed by the at least one image forming module 1 may be displayed in mid-air. The at least one positive lens 3 may include a plurality of sectors, and a mid-air image is displayed in a FoV corresponding to each sector of the at least one positive lens 3. Each user may view a mid-air image generated by a corresponding lens sector in the corresponding FoV. For example, a first image 11 output from the first lens sector 3a of the at least one positive lens 3 may be displayed in a first FoV region, and a second image 12 output from the second lens sector 3b may be displayed in a second FoV region.

The at least one positive lens 3 may include, for example, a Fresnel lens having a thickness ranging from 0.5 mm to 5 mm. The at least one positive lens 3 may have a large aperture and a short focal length to secure a wide FoV. As the ratio of the focal length to the aperture decreases, image quality may deteriorate. As the display aperture increases, the FoV of a floating image may be increased. Thus, in the mid-air image display device 10 according to the above embodiments, lenses having a large ratio of the focal length of the positive lens to the aperture, such as a Fresnel lens or diffraction lens, may be used as the at least one positive lens 3. The at least one positive lens 3 may be a dynamic lens. The dynamic lens may be, for example, a lens having a variable focal length based on liquid crystal. In this case, the mid-air image display device 10 may form a 3D mid-air image. The dynamic lens may form only one image corresponding to a particular depth of a 3D image in every moment. As a lens realignment of the dynamic lens occurs faster than the time when the eye and light are integrated, a human can perceive multiple 2D images as a single 3D image. A 3D image may be obtained by the above effect.

When the mid-air image display device 10 has an eye tracking system or a head tracking system, as the user moves, the mid-air image display device 10 may adjust a volumetric image or display another image. According to the location of user's eye/head, an image corresponding to the location may be displayed. Thus, a high quality image with reduced optical aberration may be maintained. When a volumetric image is generated, each location of the user's eye/head may be displayed as a set of images corresponding to focal planes (3D image depth) that are separated regarding the location, and a high-quality volumetric image may be formed.

A circular lens array may be formed in a gap with the diffractive multi-directional radiating waveguide D, and the gap may be filed with an optical material layer. Such a design may hide the projection system 4. The optical material layer between the diffractive multi-directional radiating waveguide D and the at least one positive lens 3 may have optical properties such as transparency and sensitivity about polarization with respect to a wavelength in a certain range. The optical material layer may change the wavefront of an incident light by a specific method, which may improve quality of a formed image.

Appropriate technology may be used for the projection system 4. For example, the projection system 4 may include, although not limited thereto, a display system such as a static image/set/video and the like, a DMD/LCoS/FLCoS/LCD/MEMS-based display system and the like, a laser/LED/lamp-based display system, a color/monochrome/arbitrary wavelength spectrum system, a polarization/non-polarization/partial polarization system, and the like.

The at least one positive lenses 3 may include, although not limited thereto, coating such as antireflection films (image contrast enhancement), polarization coating, neutral density filters, spectrum filters, active/passive filter PDLC/PSLC stacks (providing light diffusion/transmission), and the like.

Figure 12A:
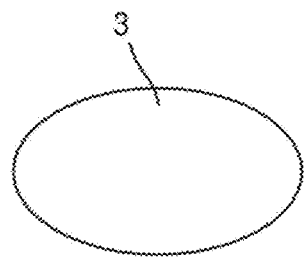
FIGS. 12A to 12J illustrate various examples of a positive lens covering a light multiplication module.
Figure 12B:
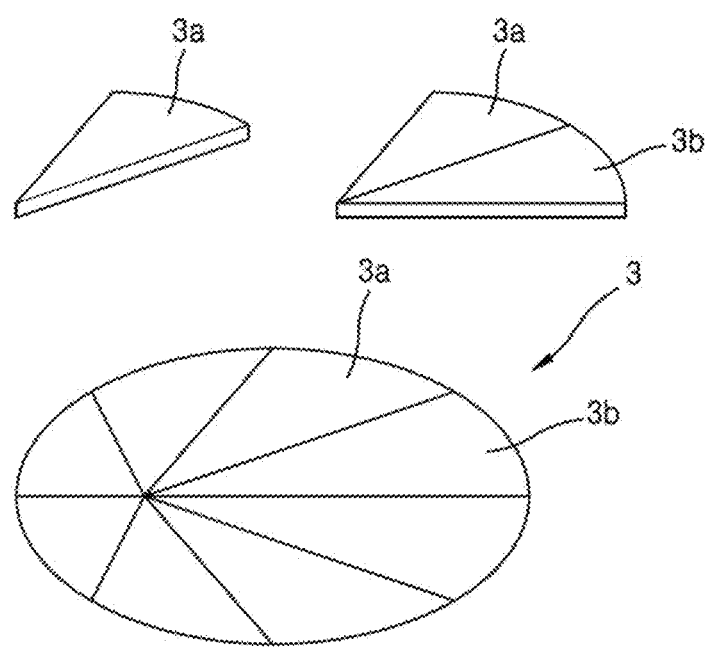
Figure 12C:
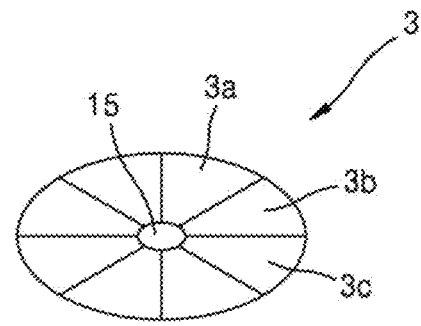

The at least one positive lens 3 may have various shapes. For example, as illustrated in FIG. 12A, the at least one positive lens 3 may be, for example, a single solid lens. The at least one positive lens 3 may be singularly disposed on the at least one light multiplication module 2. As illustrated in FIG. 12B, the at least one positive lens 3 may include a plurality of sectors, for example, a first lens sector 3*a*, a second lens sector 3*b*, and a third lens the sectors 3*c*. The first lens sector 3*a*, the second lens sector 3*b*, and the third lens the sectors 3*c* may form a circular lens array. The first lens sector 3*a*, the second lens sector 3*b*, and the third lens the sectors 3*c* may have an eccentric circular array structure. Referring to FIG. 12C, the at least one positive lens 3 may include a plurality of lens sector, for example, a first lens sector 3*a*, a second lens sector 3*b*, and a third lens the sectors 3*c*. The first lens sector 3*a*, the second lens sector 3*b*, and the third lens the sectors 3*c* may form a circular lens array having a hole 15 at the center thereof. The first lens sector 3*a*, the second lens sector 3*b*, and the third lens the sectors 3*c* may be arranged symmetrically with respect to the hole 15.

Figure 12D:
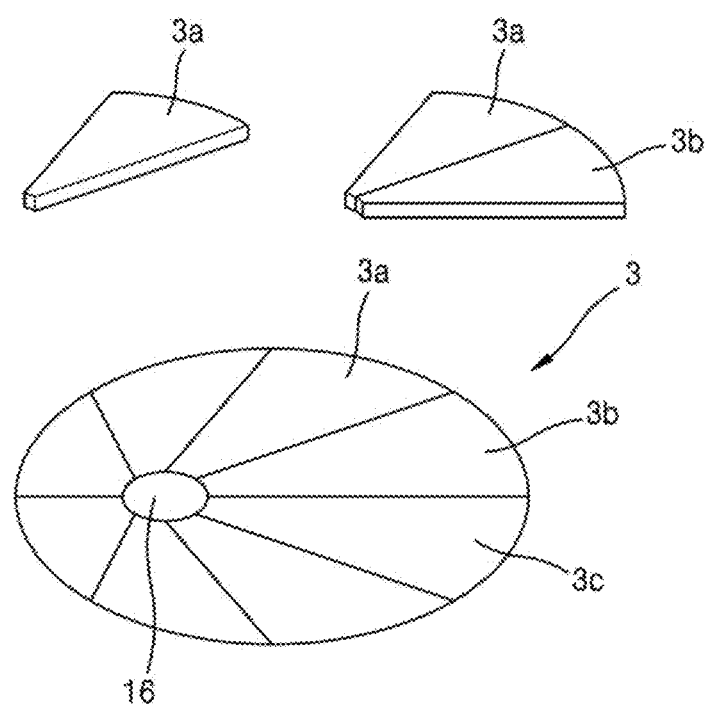
Figure 12E:
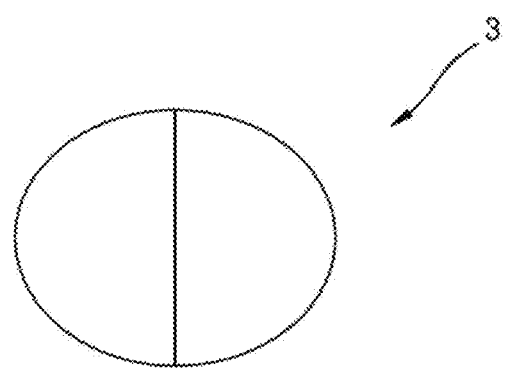
Figure 12F:
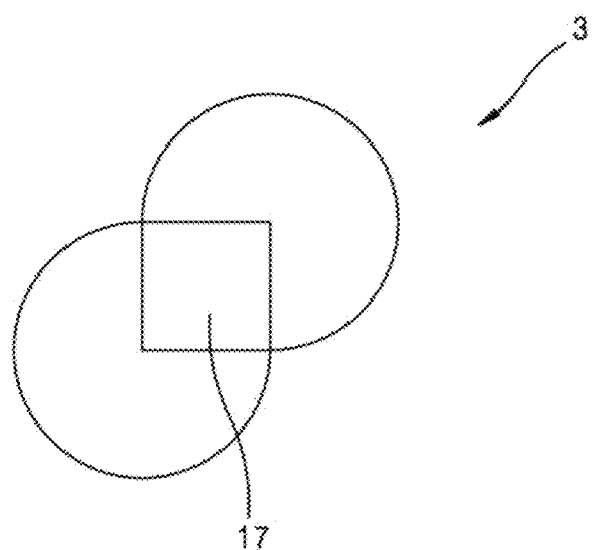

As illustrated in FIG. 12D, a first lens sector 3*a*, a second lens sector 3*b*, and a third lens the sectors 3*c* of the at least one positive lens 3 may be arranged eccentrically and asymmetrically with respect to a hole 16. The first lens sector 3*a*, the second lens sector 3*b*, and the third lens the sectors 3*c* may have a truncated fan shape. Referring to FIG. 12E, the at least one positive lens 3 may include two semi-circular lens sectors. Referring to FIG. 12F, the at least one positive lens 3 may include two lens sectors, each having a partially cut-away circular shape, and a hole 17 may be provided between the two lens sectors.

Figure 12G:
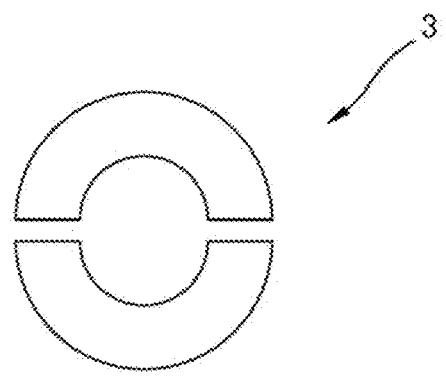
Figure 12H:
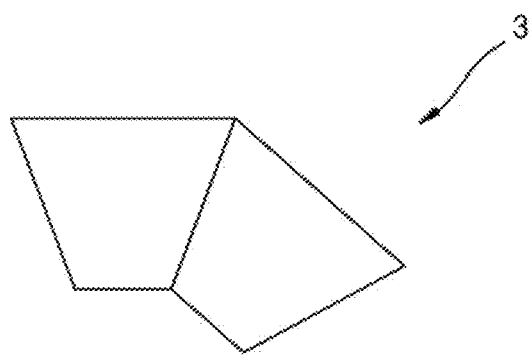
Figure 12I:
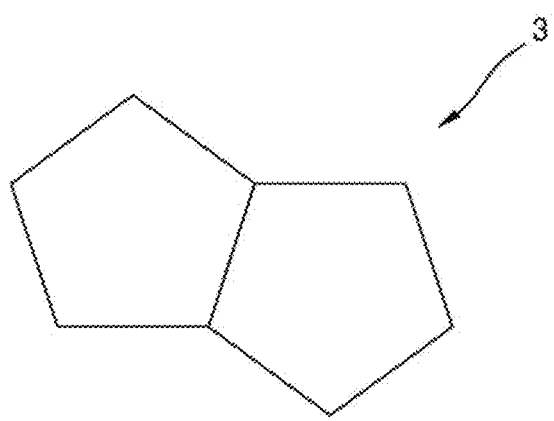
Figure 12J:
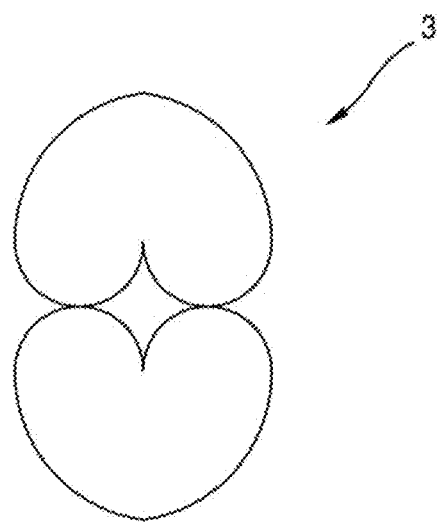

Referring to FIG. 12G, the at least one positive lens 3 may have a structure in which a ring is divided into two sectors. Referring to FIG. 12H, the at least one positive lens 3 may include two lens sectors, each having a trapezoidal shape. Referring to FIG. 12I, the at least one positive lens 3 may include two lens sectors, each having a pentagonal shape. Referring to FIG. 12J, the at least one positive lens 3 may include two lens sectors, each having a heart shape. The shape of the light multiplication module 2 may be configured to correspond to the shape of the at least one positive lens 3. The sectors of the at least one positive lens 3 may have different sizes, the projection system 4 may be disposed eccentrically, not at the center of the mid-air image display device 10, and the at least one light multiplication module 2 may be disposed on a plurality of lens sectors According to the above embodiments, an original image may be projected by using the projection system 4. The beam from the projection system 4 proceeds toward the in-coupling aperture of the light multiplication module 2, and light multiplication may occur through the multiple reflection. Then, the enlarged or multiplied aperture may be displayed in the positive lens, and each positive lens may focus an image on a focal plane of each lens and an image may be formed identical to the image transmitted from an image source. In this case, when a FoV direction is shifted, the observer may view the image formed by the corresponding lens.

When the mid-air image display device 10 according to the above embodiments is applied to a mobile device, the image may be viewed in the background of a display aperture of the mobile device.

The aperture of the mobile device may mean an entire display surface of a mobile device where an image is displayed. In other words, an image may be viewed only on the surface of a display of a mobile device where the image is directly formed. In this case, the observer's eye is disposed directly above the display of a mobile device and the out-coupled beams from the projection system 4 may be directly incident on the retina of an eye, thereby forming an actual image. Accordingly, when a user does not view at least part of a display surface from the front side, for example, when a user is disposed at a side surface of a display, the out-coupled beams from projection system 4 does not form an image on the retina so that the user may not view a mid-air image.

In this case, a mobile device such as a smartphone may be used to form a dynamic image. The dynamic image may denote, for example, an image that is not previously recorded to be used in the projection system 4. By using a smartphone, the projection system 4 may display everything, for example, an image, a video, a message, and the like, that may be displayed on a screen of the smartphone.

The mid-air image display device 10 according to the above embodiments may be integrated anywhere, for example, a side surface or a rear surface of a mobile device, and transmitting an image from a display of a smartphone display to the projection system 4 may be implemented by using a well-known projection method.

The mid-air image display device 10 according to the above embodiments may be used without a mobile device. In this case, a device other than a static image projection system or a mobile device may be used as an image source.

Figure 13A:
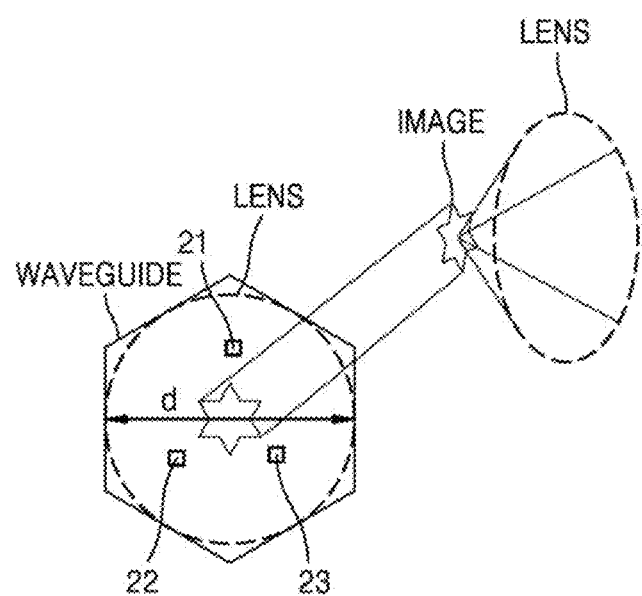
FIG. 13A illustrates an example of a simulation model.
Figure 13B:
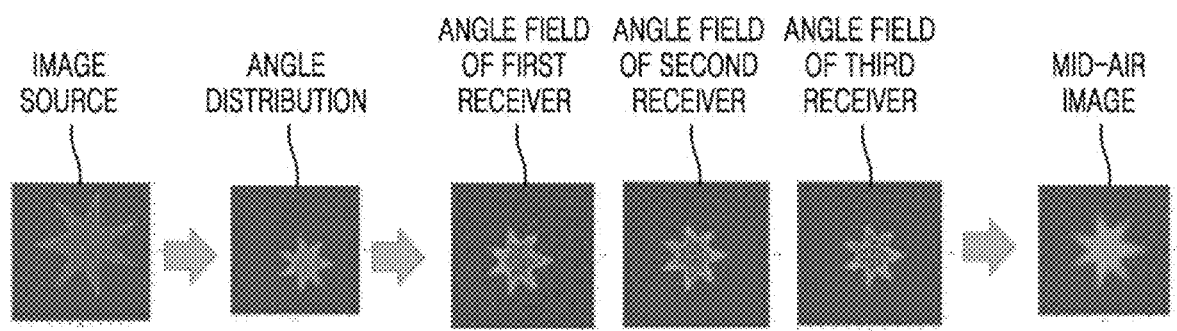
FIG. 13B illustrates a mid-air image obtained from the simulation model, according to an embodiment.

FIG. 13A illustrates the mid-air image display device 10 using beam tracking software, for example, LightTools. FIG. 13B illustrates a light transmission simulation result through a beam tracking model.

A mid-air image display device used in a model may include a waveguide, a plurality of diffraction gratings applied to a surface of the waveguide, a projection system including a digital micro-mirror device (DMD) micro projector, and a positive lens forming a mid-air image. In FIG. 13A, a model of a projection system may include a projection lens and an image source including a micro-display forming a start having seven points. An image source is disposed at a focus of the projection lens. A size of the image source and the focus of the projection lens determine angle distribution (hereinafter, referred to the angle field). A gray region in a waveguide model may denote beams that are out-coupled from the projection system, passes through the waveguide, and remains on a surface thereof. The gray region denotes a size of an operating decoupling aperture of the waveguide.

In the model, several light receivers, for example, a first receiver 21, a second receiver 22, and a third receiver 23 may be provided to control display parameters. Signals from the first receiver 21, the second receiver 22, and the third receiver 23 are illustrated in FIG. 13B. A receiver between the image source and the projection lens of a micro projector may control the FoV and size of the image source. The receivers of the projection system monitor an angle field applied to an input of the waveguide. The receivers disposed between the waveguide and the positive lens control the angle field of the projection system from the waveguide.

The receiver disposed at the focus of the positive lens controls the shape and size of a mid-air image formed by the positive lens. In FIG. 13B, images from the first receiver 21, the second receiver 22, and the third receiver 23 are arranged in an order that light from the projection system passes through a device for displaying a mid-air image. Accordingly, the beam sequentially tracked by software passes all components of the device including the first receiver 21, the second receiver 22, and the third receiver 23 disposed near some components of the device. The first receiver 21, the second receiver 22, and the third receiver 23 have no physical/material properties, and may be some planes on which light is recorded in an operation in which the light passes through the device. The signal difference at each receiver is conditioned by the loss of the beam during the absorption/scattering process along a beam path.

As the projection lens flips the image away from the image source, a sprocket on the second receiver 22 is inverted relative to the sprocket on the first receiver 21. As the beam passes through the system further, the original signal is degraded, and a less sharp and less bright image is obtained at the subsequent receiver.

Figure 14:
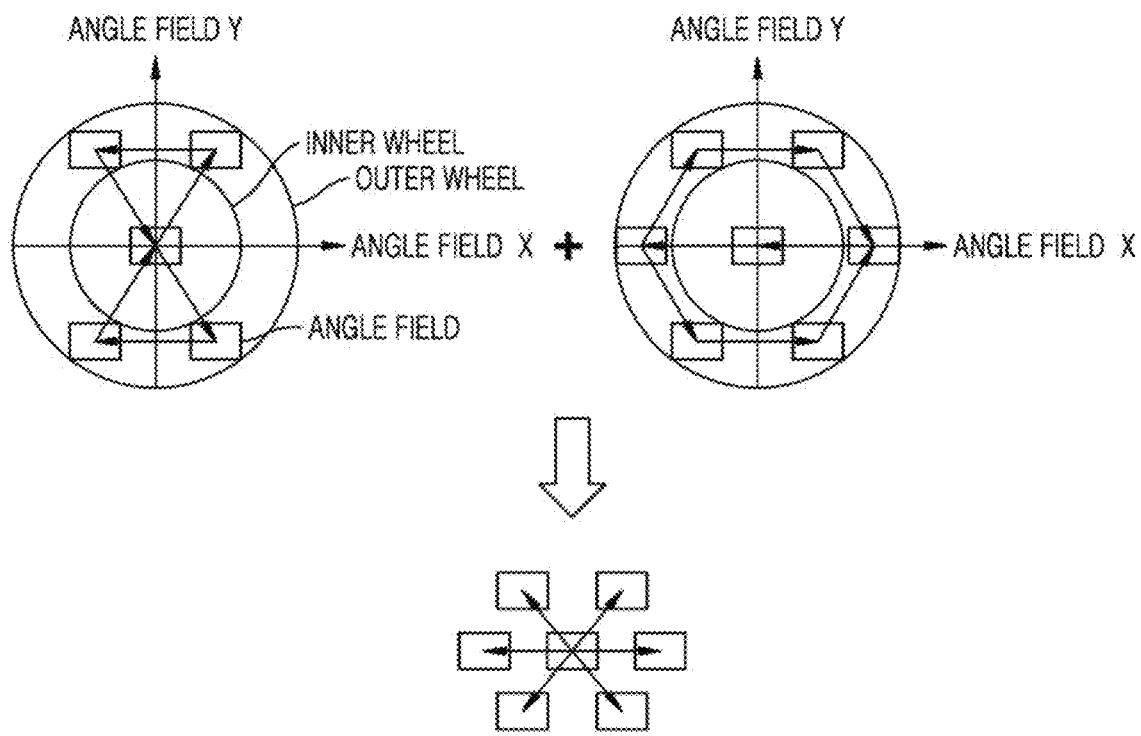
FIG. 14 illustrates a vector diagram of diffraction gratings, according to an embodiment.

FIG. 14 shows a vector diagram of diffraction gratings that describes a multiplication direction of angle distribution (hereinafter, referred to the angle field) of the projection system as well as the functions of the diffraction gratings (first transmission grating A, second transmission grating B, and reflection grating C). The functions of the diffraction gratings may include in-coupling, multiplication, out-coupling, and the like of the diffraction gratings when the angle field of a projector is diffracted in one direction or another direction due to omnidirectional field multiplication of the projection system.

A ring illustrated in FIG. 14 shows a limitation applied to a diffraction grating waveguide. An inner wheel limits an angle field of the projection system that may propagate along the waveguide due to total internal reflection. An outer wheel limits the angle field of the projection system that passes through the waveguide by optionality of the diffraction gratings. In other words, the outer wheel limits light incident on the diffraction grating to diffract at a particular angle (optional condition).

A rectangle indicates the angle field of the projection system to pass through the waveguide. An arrow indicates a vector of the diffraction grating, that is, a direction in which the incident light diffracts.

A problem of calculating the waveguide system based on the diffraction grating may be reduced in determining a distance of the vector of the diffraction grating so that a total internal reflection condition and optionality are satisfied. Furthermore, the calculation problem may also be reduced in determining the vector direction of the diffraction grating to ensure multiplication of the angle field of the projection system in a required direction. By synthesizing the angle field of the first transmission grating and the angle field of the second transmission grating, an angle field that is transformed for a multi-directional extended beam aperture may be obtained.

The mid-air image display device according to the above embodiments may be sufficiently miniaturized not only to form a mid-air image but also to be used with a mobile device. Furthermore, an embodiment may display a mid-air image within a large FoV to visualize an image without needing to use an auxiliary effect such as an additional diffusion medium, plasma, and the like. Furthermore, all elements of the mid-air image display device 10 according to the above embodiments are fixed and have no moving elements.

The mid-air image display device 10 according to the above embodiments may also be used to create a hologram user interface when interacting with household appliances such as refrigerators, hobs, TVs, air conditioners, intercoms, and the like, as well as image displays. Furthermore, the mid-air image display device 10 according to the above embodiments may be used in dangerous industries. In other words, a control element may appear to fly in mid-air. In this case, an additional camera may be used to detect, for example, explicit interactions that can be expressed as a user gesture. The gesture may include for example, a symbolic gesture such as a thumbs-up gesture, an instructive gesture such as a pointing gesture, an icon gesture that reproduces a specific movement, or a pantomimic gesture that uses an invisible tool.

Furthermore, an additional camera may be used to detect implicit interactions. In this case, proxemics may be understood as a symbol system in which space and time of a communication process configuration have a semantic load. For example, when two users each having a mobile device including the mid-air image display device 10 according to the above embodiments use the mid-air image display device 10, as the mid-air image display device 10 may project a video, a converser's hologram may change the time and context of communication. In this case, this may be referred to as the hologram, and may not be the same as the user's body size. Simultaneously, the modification of the volumetric image may also occur by the user's participation (using gestures, pressing buttons, voice control, user's eye movement, and the like), or without the user's participation in a converser's message using pre-programmed reactions (that is, visual change 3D images). In this case, for example, when the user uses the mid-air image display device 10 with additional sensors for the user's body position and reaction, communication between the converser's holograms may occur without active operations by an user.

Interactions between devices such as the Internet of things may occur. Context-sensitive functions to interact with the generated floating images may be added by using multiple compact devices. For example, this interaction between the devices may serve as a temporary space to transmit information from one hologram to another.

Although some embodiments have been described, it should be understood that the gist of the disclosure is not limited to these specific embodiments. Reversely, the spirit of the disclosure includes all alternatives, modifications, and equivalents that may be included within the spirit and scope of the claims. Furthermore, the disclosure retains all equivalents of the claimed disclosure, even if the claims are modified in a consideration process.

The mid-air image display device according to the above embodiments may display a high-quality magnified image. The mid-air image display device may be configured to be compact by having a plurality of diffraction gratings.

What is claimed is:

1. A mid-air image display device comprising:
   a projection system configured to output a light beam for an image;
   at least one positive lens; and
   a light multiplication module comprising a first transmission grating, a second transmission grating, a waveguide and a reflection grating, and configured to receive the light beam from the projection system and transmit the received light beam through the first transmission grating, the second transmission grating, the waveguide and the reflection grating,
   wherein the at least one positive lens is disposed on the light multiplication module, and configured to receive the light beam transmitted through the light multiplication module to form a mid-air image.

2. The display device of claim 1, wherein the projection system is disposed above the at least one positive lens,
   wherein the at least one positive lens is disposed above the waveguide of the light multiplication module, and
   wherein the first transmission grating, the reflection grating, and the second transmission grating are sequentially arranged below the waveguide.

3. The display device of claim 1, wherein the projection system is disposed below the at least one positive lens, wherein the at least one positive lens is disposed below the waveguide, and wherein the first transmission grating, the second transmission grating, and the reflection grating are sequentially arranged above the waveguide.

4. The display device of claim 1, wherein the projection system is disposed above the at least one positive lens that is disposed above the light multiplication module, wherein the waveguide is disposed below the first transmission grating, and wherein the second transmission grating and the reflection grating are arranged below the waveguide.

5. The display device of claim 1, wherein the at least one positive lens is disposed below the reflection grating of the light multiplication module, wherein the first transmission grating, the second transmission grating, and the waveguide are disposed above the reflection grating, and wherein the light multiplication module is disposed below the projection system.

6. The display device of claim 1, wherein the at least one positive lens is disposed above the reflection grating of the light multiplication module, wherein the second transmission grating, the first transmission grating, and the waveguide are sequentially arranged below the reflection grating, and wherein the projection system is disposed below the light multiplication module.

7. The display device of claim 1, wherein the at least one positive lens is disposed below the reflection grating of the light multiplication module, wherein the second transmission grating, the waveguide, and the first transmission grating are sequentially disposed above the reflection grating, and wherein the projection system is disposed above the light multiplication module.

8. The display device of claim 1, wherein the waveguide comprises a sector of a total internal reflection-based light transmission diffraction multi-radial directional waveguide.

9. The display device of claim 8, wherein the light multiplication module further comprises a prism for in-coupling of light.

10. The display device of claim 8, wherein one of anti-reflective coating, semi-reflective coating, a dichroic filter, a neutral filter, and a diffraction optical element is provided on a surface of the waveguide.

11. The display device of claim 8, wherein the first transmission grating, the second transmission grating, and the reflection grating are recorded on a film, and are a volume holographic grating deposited on a surface of the waveguide or a relief diffraction element formed on a surface of the waveguide.

12. The display device of claim 11, wherein the light multiplication module has a shape of one disc sector, and wherein the light multiplication module forms a disc shape as a whole.

13. The display device of claim 12, wherein each of the at least one positive lens has a shape of one disc sector, wherein a radius of the disk sector matches a radius of the light multiplication module, and wherein a corresponding one of the at least one positive lens is disposed on the light multiplication module.

14. The display device of claim 13, wherein the at least one positive lens forms a circular lens array as a whole.

15. A method of operating a mid-air image display device comprising a projection system, a positive lens, and a light multiplication module comprising a first transmission grating, a second transmission grating, a waveguide, and a reflection grating, the positive lens being disposed on the light multiplication module, the method comprising:

transmitting a beam forming an image from the projection system to the first transmission grating, the beam, as a result of diffraction at the first transmission grating, being split into a $1^{st}$ order diffraction beam and a $0^{th}$ order diffraction beam of the first transmission grating;

transmitting the $0^{th}$ order diffraction beam of the first transmission grating to the second transmission grating, the $0^{th}$ order diffraction beam of the first transmission grating, as a result of diffraction at the second transmission grating, being split into a $1^{st}$ order diffraction beam and a $0^{th}$ order diffraction beam of the second transmission grating;

transmitting the $1^{st}$ order diffraction beams of the first and second transmission gratings and the $0^{th}$ order diffraction beam of the second transmission grating to the waveguide;

allowing the $1^{st}$ order diffraction beams of the first and second transmission gratings transmitted to the waveguide at an angle corresponding to a total internal reflection angle range to be reflected at an interface between air and the first transmission grating and an interface between the waveguide and the reflection grating, thereby to propagate along the waveguide to form another $1^{st}$ order diffraction beam at the second transmission grating as a result of diffraction of the $1^{st}$ order diffraction beam of the first transmission grating at the waveguide, and to form another $1^{st}$ order diffraction beam at the first transmission grating as a result of diffraction of the $1^{st}$ order diffraction beam of the second transmission grating at the waveguide;

diffracting, by the reflection grating, the other $1^{st}$ order diffraction beam of the second transmission grating and the other $1^{st}$ order diffraction beam of the first transmission grating to be out-coupled to the positive lens through the waveguide, the second transmission grating, and the first transmission grating; and refracting the out-coupled beams and focusing a mid-air image on a focal plane, by the positive lens.

16. The method of claim 15, wherein the $0^{th}$ order diffraction beam of the second transmission grating passes through the waveguide above the reflection grating, the $0^{th}$ order beam of the second transmission grating is split into a $1^{st}$ order diffraction beam and a $0^{th}$ order diffraction beam of the reflection grating, and then the $0^{th}$ order diffraction beam of the reflection grating is not considered.

17. The method of claim 15, wherein the $1^{st}$ order diffraction beam of the reflection grating passes through the waveguide, the second transmission grating, and the first transmission grating, and reflected back to the waveguide due to total internal reflection in a surface of the first transmission grating, and wherein the $1^{st}$ order diffraction beam of the reflection grating is transmitted to the first transmission grating, and, as a result of diffraction at the first transmission grating, is split into still another $1^{st}$ order diffraction beam and another $0^{th}$ order the diffraction beam of the first transmission grating.

18. The method of claim 15, wherein the light multiplication module is configured to allow the mid-air image to be viewed only within a range perpendicular to the mid-air image display device.

19. The method of claim 15, wherein the light multiplication module is configured to allow the mid-air image to be viewed both in a range perpendicular to the mid-air image display device and in a range deviated from the range perpendicular to the mid-air image display device.

20. A mid-air image display device comprising:
- a projection system configured to output a light beam for an image;
- a second positive lens disposed below the projection system;
- a light multiplication module configured to receive the light beam output from the projection system;
- a first positive lens and a second positive lens disposed below and above the light multiplication module, respectively, and configured to receive the light beam transmitted through the light multiplication module to form a mid-air image,
- wherein the light multiplication module comprises:
  - a reflection grating disposed above the first positive lens;
  - a waveguide disposed above the reflection grating;
  - a second transmission grating disposed above the waveguide;
  - a first transmission grating disposed above the second transmission grating and below the second positive lens.

* * * * *